US012148057B2

(12) United States Patent
Andrews et al.

(10) Patent No.: US 12,148,057 B2
(45) Date of Patent: Nov. 19, 2024

(54) DATASET DISTINCTIVENESS MODELING

(71) Applicant: Moat Metrics, Inc., Spokane, WA (US)

(72) Inventors: David Craig Andrews, Duvall, WA (US); Deanna Lily Emery, Chicago, IL (US); Melody Denise Litovkin, Redmond, WA (US); Ke Feng, Chicago, IL (US); Stacy P. Chronopoulos, Chicago, IL (US); Grace Edith Carlson, Issaquah, WA (US)

(73) Assignee: Moat Metrics, Inc., Spokane, WA (US)

( * ) Notice: Subject to any disclaimer, the term of this patent is extended or adjusted under 35 U.S.C. 154(b) by 221 days.

(21) Appl. No.: 17/832,345

(22) Filed: Jun. 3, 2022

(65) Prior Publication Data
US 2023/0394606 A1    Dec. 7, 2023

(51) Int. Cl.
*G06Q 30/00*    (2023.01)
*G06N 20/00*    (2019.01)
*G06Q 50/18*    (2012.01)

(52) U.S. Cl.
CPC .......... *G06Q 50/184* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2011/0047166 A1* | 2/2011 | Stading | G06F 16/332 707/E17.109 |
| 2014/0180726 A1* | 6/2014 | Lavie | G06Q 40/08 705/4 |
| 2016/0253679 A1 | 9/2016 | Venkatraman et al. | |
| 2016/0260033 A1* | 9/2016 | Keyngnaert | G06F 17/18 |
| 2021/0349928 A1* | 11/2021 | Li | G06N 5/02 |
| 2023/0161631 A1* | 5/2023 | Sharma | G06F 9/4856 718/104 |
| 2023/0394607 A1 | 12/2023 | Andrews | |

OTHER PUBLICATIONS

Research on Quantitative Model of Brand Recognition Based on Sentiment Analysis of Big Data, Author: Zhou, Lichun, School of Media and Communication, Shangqiu Normal University, Shangqiu, China, China, Publication info: Frontiers in psychology 13 : 915443. (May 12, 2022). (Year: 2022).*

(Continued)

*Primary Examiner* — Matthew T Sittner
(74) *Attorney, Agent, or Firm* — Lee & Hayes, P.C.

(57) ABSTRACT

Systems and methods for dataset distinctiveness modeling are disclosed. For example, databases may be queried for datasets associated with intellectual property assets, particularly trademarks. A vector representation may be generated for the mark in question, and a vector representation may be generated for the description of goods and/or services associated with the mark. A machine learning model may be trained to predict a distinctiveness score based on the vector representations, similarity metrics between the trademark and other marks, goods and services of the other marks, and context data associated with the trademarks.

17 Claims, 14 Drawing Sheets

(56) References Cited

OTHER PUBLICATIONS

Deep learning approach to trademark international class identification, Author: Showkatramani, Girish, et al., . . . Conference on Machine Learning and Applications, ICMLA 2019 : 608-612. Institute of Electrical and Electronics Engineers Inc. (Dec. 2019) (Year: 2019).*

Use of Artificial Intelligence to Analyse Risk in Legal Documents for a Better Decision Support [arXiv], Author: Chakrabarti, Dipankar, et al., . . . Publication info: arXiv : 6 . arXiv. (Nov. 22, 2019). (Year: 2019).*

PCT Search Report and Written Opinion mailed Aug. 8, 2023 for PCT application No. PCT/US2023/024276, 8 pgs.

* cited by examiner

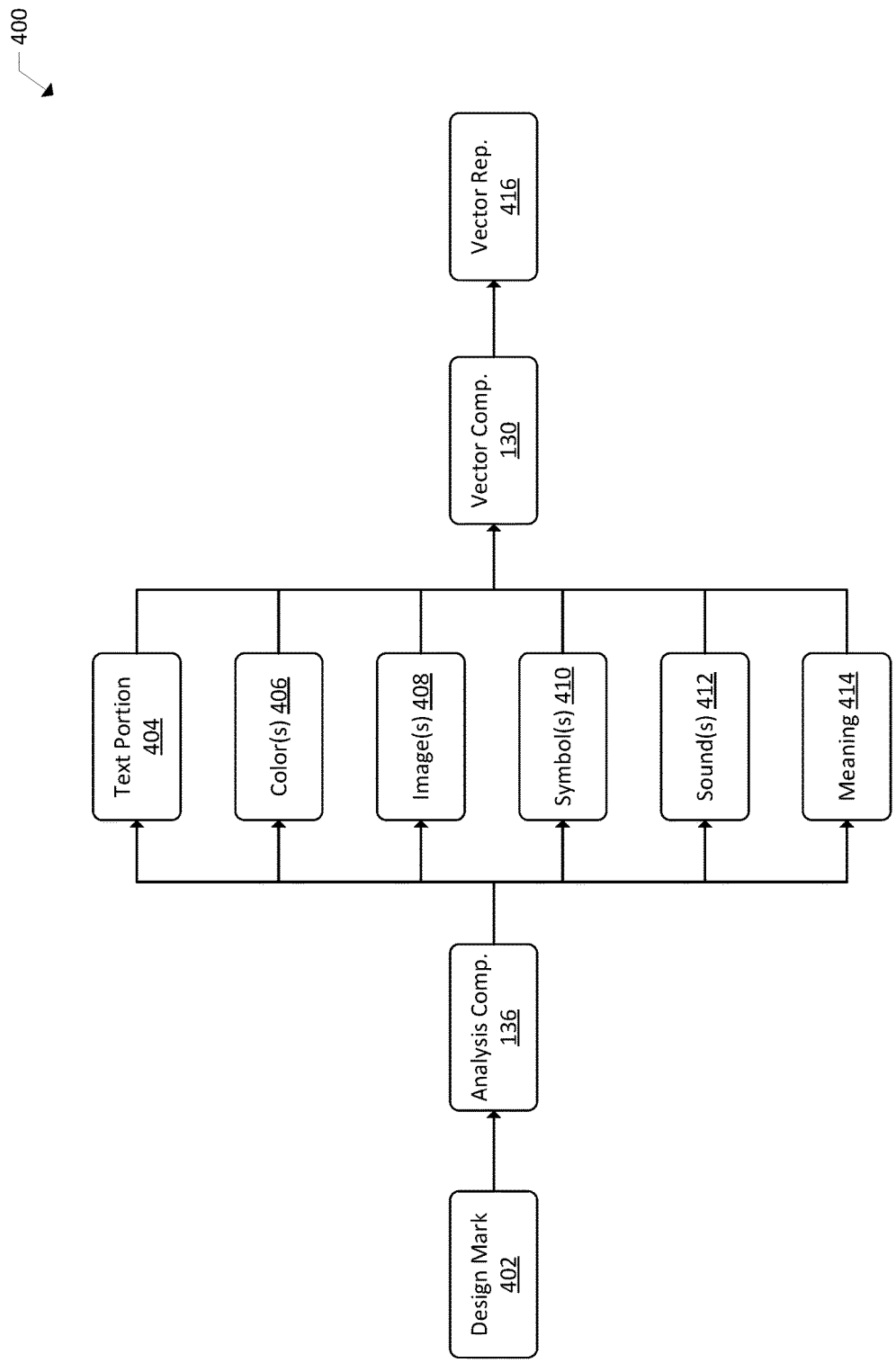

DATASET DISTINCTIVENESS MODELING

BACKGROUND

Brand is an important asset to many businesses. Brand strength can be an important factor in valuing brands. Described herein are improvements in technology and solutions to technical problems that can be used to, among other things, assist in quantifying brand strength.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a conceptual diagram of how an analysis component of the system described herein determines features of a trademark and generates a vector representation.

DETAILED DESCRIPTION

Figure 1:
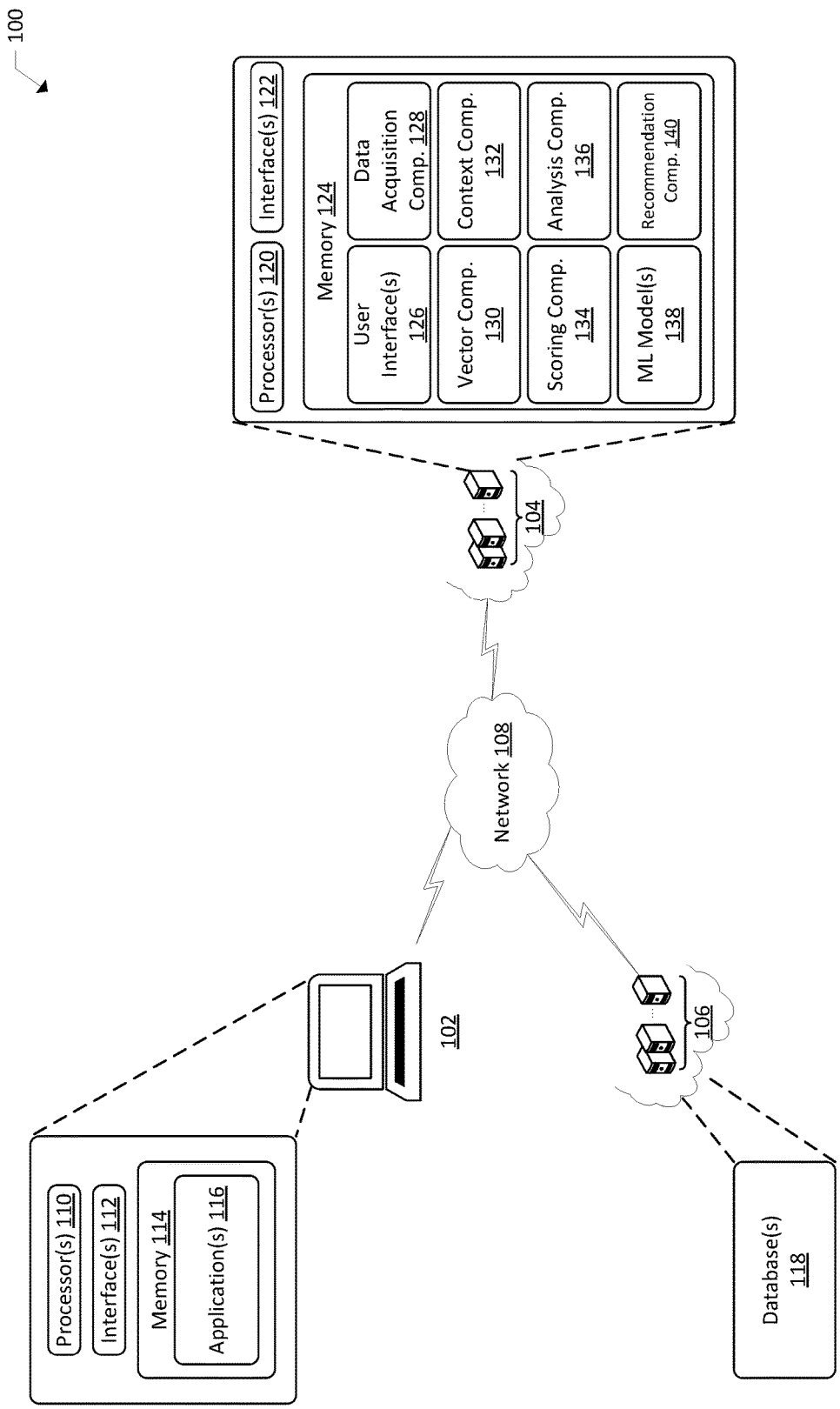
FIG. 1 illustrates a schematic diagram of an example environment for dataset distinctiveness modeling.

Systems and methods for dataset distinctiveness modeling are disclosed. Take, for example, a situation where an entity desires to quantitatively determine a distinctiveness of a trademark or otherwise a brand. Conventionally, trademark distinctiveness is a product of legal definitions, which may vary across legal jurisdictions and over time as statutes and jurisprudence are updated. In the United States, for example, trademark distinctiveness is measured in terms of four primary categories: generic marks; descriptive marks; suggestive marks; arbitrary marks; and fanciful marks. Generic marks are those that define the good and/or service that the mark is used in commerce with. Examples of generic marks include "SOAP" for soap, "SODA" for carbonated beverages, "DOG FOOD" for dog food, etc. Generic marks such as these are generally entitled to no trademark strength and are considered not distinctive. Descriptive marks are those that generally describe a good and/or service. Examples of descriptive marks include "SUDSY" for soap, "STINKY" for cheese, "HEALTHY" for dog food, etc. Descriptive marks such as these are considered to be more distinctive than generic marks, but to rise to the level of distinctiveness needed to be a protectable mark, these marks generally must acquire distinctiveness through use in commerce for a given period of time or through some proof that the mark has acquired a secondary meaning in the minds of consumers as not just a description of a product but also as a source identifier. Next up are suggestive marks, which are marks that do not necessarily describe the goods and/or services at issue, but suggest to a consumer that the mark is sold in connection with such goods and/or services. Examples of suggestive marks include "NETFLIX®" suggesting movies or "flicks" that are ordered online, "COPPERTONE®" suggesting a skin color after using sunscreen or tanning lotion, etc. Suggestive marks such as these are considered to be more distinctive than descriptive marks and these marks in and of themselves are distinctive enough to be protectable. There are arbitrary marks which are those marks that, as the name implies, do not have anything to do with the goods and/or services at issue, and there are fanciful marks, which are made up words. Example arbitrary marks include "DELTA®" for airplane services, "APPLE®" for computers, "COACH®" for luxury accessories, etc. Example fanciful marks are CLOROX® for bleach or LYSOL® for cleaning products. These marks are afforded the highest degree of distinctiveness. Note that in each example, the degree of distinctiveness of a given mark is determined in relation to the goods and/or services that it is sold in conjunction with. For example, while SOAP may be generic when used as a source identifier for soap, SOAP may be an arbitrary mark when used as a source identifier for software products, or chairs, or food. Also, while the examples above are provided to show clear examples of the distinctions between trademark distinctiveness categories, other marks are not so clear and arguments may be made that a given mark used in connection with a given good or service is descriptive or suggestive, or generic or descriptive, etc. For these and other reasons described more fully herein, quantification of trademark distinctiveness may be desirable.

To do so, a data acquisition component of an analysis system may acquire data associated with a trademark to be evaluated for distinctiveness. The acquired data may be received from one or more remote systems that include one or more databases of information. For example, a given database may store data indicating trademark registrations and/or trademark registration applications. This data may include, for a given trademark, the mark at issue, a description of the goods and/or services sold in connection with the mark, and contextual data associated with the trademark, such as a registration number, an application number, a registration date, an application date, a classification of the goods and/or services, a mark type, a register type, a registrant name, a registrant address or other contact identifier, mark use information, disclaimer information, as well as file wrapper information indicating documents that have been filed in association with a trademark application, including whether declarations of continuous use and/or of incontestability have been filed. Additionally, one or more other databases may be queried for information associated with a trademark that is not necessarily present in a trademark registration or trademark application. Such information may include information associated with the registrant/applicant, other trademarks utilized in association with the trademark at issue, evidence of use in commerce, litigation data, data indicating a degree of saturation of similar marks, and/or other factors that may impact trademark distinctiveness. Some example other factors may include translations of marks from one language to another and/or dictionary definitions. It should be understood that identification of such factors and/or the weighting of such factors as described more fully herein may be determined utilizing machine learning techniques where a machine learning model is trained to identify when certain data negatively or positively impacts trademark distinctiveness and to what degree.

A vector component of the analysis system may be configured to receive the acquired data from the data acquisition component and to generate one or more vector representations of the data. For example, the vector component may first parse the acquired data to determine which portion of the data represents the trademark at issue. To do so, field identifiers may be generated and utilized to identify which portions of the data represent the various information described above. Once the vector component determines which portion of the data represents the trademark at issue, the vector component may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, an analysis component of the system may generate metadata to associate with the trademark that defines the various components of the trademark in a way that the vector component can utilize to generate a vector representation of the trademark. For example, the analysis component may take the image data and may generate text data indicating attributes of the image at issue, such as identification of objects depicted in the image and descriptions of those objects. To do so, computer vision techniques may be utilized as described in more detail below. Additionally, the analysis component may utilize the color data to generate a textual representation of the colors at issue. For example, when the mark includes the colors blue, red, and yellow, the analysis component may identify those colors and generate metadata indicating a textual representation of those colors. The symbol data may be utilized to generate metadata indicating that there is at least one symbol in the mark, identifying the symbol, and/or generating a textual representation of the symbol. For example, if the mark includes a "peace sign," the metadata may include an identifier of the peace sign and/or may include a textual representation of the symbol, specifically "peace sign." The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning collectively than the elements individually. For example, a mark with an image of a baby goat and an image of a stone, when combined, may mean "you rock," even though those terms are not present in the mark. Some or all of this metadata may be formatted such that the vector component may utilize the metadata to generate a vector representation of the mark.

To generate a vector representation of the mark, the vector component may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based application programming interfaces (APIs), etc. In each of these scenarios, the presence or absence of certain elements in the mark may indicate the location of the vector representation of the mark in the vector space.

In addition to generating a vector representation of the mark at issue, the vector component may also generate a vector representation of the goods and/or services that are associated with the mark. To do so, the data representing the goods and/or services may be parsed from the data received from the data acquisition component. This data may include the description of goods and/or services from a trademark registration and/or trademark registration application, and/or the data may be determined from marketing data, product descriptions available to consumers, etc. The same or similar techniques as used to generate the vector representation of the mark may be utilized to generate the vector representation of the description of goods and/or services. As such the description vector representation may be generated and may be associated with a second location in the vector space.

A context component of the analysis system may be configured to generate context data from the acquired data and to utilize the context data to inform generation of the vector representations. For example, the context component may be utilized to determine that a portion of a registered mark has been disclaimed and thus should not be considered in and of itself as a portion of the mark at issue. Other context data indicating attributes of the mark and/or the goods or services may be utilized to more accurately determine what the mark and/or goods or services are. This context data may be utilized by the vector component to generate the vector representations as described herein.

Once a vector representation of the mark and a vector representation of the description of goods and/or services are generated, a scoring component of the analysis system may be configured to generate a numerical expression of the distinctiveness of the mark in association with its goods and/or services. The numerical expression may be a score, which may be placed on a scale. For example, a distinctiveness score scale may be set between 1 and 100, and the score for any given mark may be between or include 1 and 100. It should be understood that while this scale is utilized as an example here, it should not be considered as limiting. The numerical expression may be any numerical expression and the scale may be any scale. To determine the score, a distance between the first location of the mark vector representation and the second location of the description vector representation in the vector space may be determined. Shorter distances may indicate less favorable distinctiveness scores, while longer distances may indicate more favorable distinctiveness scores. For example, since the vector representations are representations of the mark and description, respectively, the more similar a mark is to its description of goods and/or services, the more similar the vector representations will be. To the contrary, when a mark differs drastically from its goods and services, the respective vector representations will also differ drastically. The scoring component may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks.

In addition to the above score indicating the distance between the mark vector representation and the description vector representation, the scoring component may also compute scores associated with the context data and/or may weight the distance-based score based at least in part on the context data. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark.

Once a trademark distinctiveness score is determined that score may be utilized for one or more purposes. By way of example, a recommendation component may be configured to compare the trademark distinctiveness score to one or more score thresholds to determine whether a recommendation should be generated and sent. For example, a given trademark distinctiveness score may indicate that the mark is likely descriptive (or otherwise falls below a distinctiveness threshold) of the goods and/or services sold in connection with the mark. In this example, the recommendation component may generate a recommendation that a change be made based at least in part on the trademark distinctiveness score. The change may be to change characteristics of the mark, to change the description of goods and/or services, and/or to change or otherwise update the context data that produced the score. In examples, the recommendation may include options to increase the score and may provide functionality for a user to select to cause the recommended change to occur. In other examples, the analysis system may utilize the score to provide an indication of a likely classification of the trademark, such as whether the trademark is generic, descriptive, suggestive, and/or arbitrary or fanciful. In still other examples, a similar mark search may be performed utilizing the score and/or the mark vector representation. For example, the mark vector representation at issue may be utilized to identify similar mark vector representations for other marks. A comparison may be performed among these reference mark vector representations to determine how unique the mark is in association with other marks used in a given marketplace, in a given good/service classification, on a given trademark registration register, etc. In further examples, the mark vector representation may be utilized to perform a mark comparison with a given reference mark. For example, in a litigation situation where a likelihood of confusion is alleged as between two marks, vector representations of the two marks may be generated and compared to determine a similarity of the marks. A similar process may be performed for a similarity of the goods and/or services sold in connection with those marks. A similar process may also be performed with respect to trade channels for the marks. In still other examples, the distinctiveness score may be utilized to assess a strength of the mark, which may be useful in a litigation setting and also for purposes of valuing a trademark and the goodwill associated therewith.

In these and other examples, the various datasets, including those related to trademarks, may be utilized by the analysis system to quantify a degree of distinctiveness as between datasets, and to model that distinctiveness in a way that is useful for a myriad of purposes, including purposes associated with brands and brand valuation.

Additionally, while trademark distinctiveness may be considered as a degree of distinctiveness of a mark with respect to its goods and/or services, distinctiveness scoring may take on other meanings and flavors. For example, a user may desire to determine how distinctive a trademark is with respect to other trademarks, how contextual data impacts trademark distinctiveness from a validity perspective, from a financing perspective, from a valuation perspective, etc. In these and other examples, a trademark distinctiveness score may be generated utilizing machine learning techniques that take into consideration a multitude of factors across several datasets.

To do so, a vector representation of a trademark may be generated, and a vector representation of goods and/or services of the trademark may be generated. Additionally, as described herein, context data associated with the trademark may be gathered and utilized. This data may be utilized to determine a distinctiveness of the trademark with respect to its goods and/or services. In addition to this determination, an analysis of other trademarks may also be performed in conjunction with the trademark at issue. To do so, in examples, vector representations of the goods and/or services of other trademarks may be generated. For example, a database of trademarks may be maintained and/or accessed and some or all of the goods and/or services associated with these trademarks may be utilized to generate vector representations. These vector representations of the goods and/or services of other trademarks may be compared to the vector representation of the goods and/or services of the trademark at issue. A subset of these other trademarks may be selected based at least on a degree of similarity as between the vector representation of the goods and/or services of the mark at issue and the reference vector representations of the goods and/or services of the other marks. For example, the vector representations may be plotted in a vector space and a distance between the vector of the goods and/or services of the mark at issue and the other vectors may be determined. When distances between vectors are shorter, that may indicate more similarity as between goods and/or services. When distances are longer, that may indicate less similarity as between goods and/or services. In other examples, vector aggregation techniques may be utilized as to the reference vectors to determine a centroid and/or common vector for groups of marks. Distances between the vector at issue and the group centroids may be utilized to determine the subset of marks to analyze further.

Once a subset of trademarks are identified as described above, or in some examples when a corpus of trademarks is identified, comparison of the trademark vector at issue may be performed with vector representations of the trademarks in the subset of trademarks. As described herein, a similarity metric may be generated that indicates a distance between the mark at issue and the other marks in the subset of marks. When at least one of the other marks is close in distance to the mark at issue, that may indicate that the mark's distinctiveness is less than if all vectors of the subset of the marks are a greater distance from the mark vector at issue. In some examples, instead of performing a comparison with only the subset of trademarks, the analysis of the subset of trademarks may be weighted more than other marks not in the subset of trademarks.

Utilizing some or all of the vector of the mark at issue, the vector of the goods and/or services at issue, the comparison of the mark to the goods and/or services, the context data, the similarity metric with other marks, the analysis of the subset of the marks, etc., a trained machine learning model may be generated and utilized to determine distinctiveness scores. For example, as described in more detail herein, a machine learning model may be trained utilizing a training dataset of some or all of the information described herein. The machine learning model may also be trained based at least in part on outcome data that provides a ground truth for trademark distinctiveness. This ground truth data may include litigation-related data such as data indicating that a reference trademark is associated with a principal register of trademarks or a supplemental register of trademarks, data indicating whether a disclaimer is associated with the reference trademark, data indicating whether an affidavit of incontestability is associated with the reference trademark, and/or data indicating whether an affidavit of continuous use for a predetermined time is associated with the reference trademark. The training data may also include data indicating distinctiveness findings associated with litigation of a reference trademark, data indicating findings of famousness associated with the litigation, and/or data indicating outcomes of cancellation proceedings associated with the reference trademark. A trained machine learning model may be generated and may utilize some or all of the data described herein to generate a trademark distinctiveness score for a given trademark. This distinctiveness score may be utilized for one or more purposes, including for litigation purposes, for brand selection purposes, for brand valuation purposes, for loan acquisition, for insurance purposes, etc. For example, as part of due diligence for acquiring a loan, such as an intellectual property secured loan, the distinctiveness score may be utilized to determine whether the loan should be issued, what level of diligence is to be performed, and/or terms of the loan such as loan amount, etc. When performing the analyses described herein with respect to generating a trademark distinctiveness score, an approximate nearest neighbors (ANN) approach may be taken to determine a similarities between vectors in a vector space, as described herein.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment for dataset distinctiveness modelling. The environment may include, for example, a client device 102, an analysis system 104, one or more remote systems 106. Each of these components may be configured to communicate with each other, such as via a network 108.

The client devices 102 may include components such as, for example, one or more processors 110, one or more network interfaces 112, and/or memory 114. The memory 114 may include components such as, for example, one or more applications 116. As shown in FIG. 1, the client devices 102 may include, for example, a computing device, a mobile phone, a tablet, a laptop, and/or one or more servers. The components of the client device 102 will be described below by way of example. It should be understood that the example provided herein is illustrative, and should not be considered the exclusive example of the components of the client device 102. In examples, the applications 116 of the client device 102 may be configured to display user interfaces, such as secure user interfaces, and to receive user input. The user input may be associated with trademark registrations or other actions associated with branding.

The one or more remote systems 106 may include one or more components such as, for example, one or more databases 118. The databases 118 may include intellectual property data representing intellectual property assets held by entities, such as all available trademark registrations and applications associated with one or many trademark offices around the world. The databases 118 may also include business information associated with the entities, whether or not they are associated with intellectual property assets. The business information may include any information associated with the business of the entity, such as, for example, revenue information, cost information, market identifiers, products, services, credit history, size, employee information, etc.

The analysis system 104 may include one or more components such as, for example, one or more processors 120, one or more network interfaces 122, and/or memory 124. The memory 124 may include one or more components such as, for example, one or more user interfaces 126, a data acquisition component 128, a vector component 130, a context component 132, a scoring component 134, an analysis component 136, one or more machine learning models 138, and/or a recommendation component 140. These components of the analysis system 104 will be described in detail below.

By way of example, the data acquisition component 128 may acquire data associated with a trademark to be evaluated for distinctiveness. The acquired data may be received from the one or more remote systems 106 that include the one or more databases 118 of information. For example, a given database 118 may store data indicating trademark registrations and/or trademark registration applications. This data may include, for a given trademark, the mark at issue, a description of the goods and/or services sold in connection with the mark, and contextual data associated with the trademark, such as a registration number, an application number, a registration date, an application date, a classification of the goods and/or services, a mark type, a register type, a registrant name, a registrant address or other contact identifier, mark use information, disclaimer information, as well as file wrapper information indicating documents that have been filed in association with a trademark application, including whether declarations of continuous use and/or of incontestability have been filed. Additionally, one or more other databases 118 may be queried for information associated with a trademark that is not necessarily present in a trademark registration or trademark application. Such information may include information associated with the registrant/applicant, other trademarks utilized in association with the trademark at issue, evidence of use in commerce, litigation data, data indicating a degree of saturation of similar marks, and/or other factors that may impact trademark distinctiveness. It should be understood that identification of such factors and/or the weighting of such factors as described more fully herein may be determined utilizing machine learning techniques where a machine learning model 138 is trained to identify when certain data negatively or positively impacts trademark distinctiveness and to what degree.

The vector component 130 may be configured to receive the acquired data from the data acquisition component 128 and to generate one or more vector representations of the data. For example, the vector component 130 may first parse the acquired data to determine which portion of the data represents the trademark at issue. To do so, field identifiers may be generated and utilized to identify which portions of the data represent the various information described above. Once the vector component 130 determines which portion of the data represents the trademark at issue, the vector component 130 may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, the analysis component 136 may generate metadata to associate with the trademark that defines the various components of the trademark in a way that the vector component 130 can utilize to generate a vector representation of the trademark. For example, the analysis component 136 may take the image data and may generate text data indicating attributes of the image at issue, such as identification of objects depicted in the image and descriptions of those objects. To do so, computer vision techniques may be utilized. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification) —One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR) —Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT) —Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

Additionally, the analysis component 136 may utilize the color data to generate a textual representation of the colors at issue. For example, when the mark includes the colors blue, red, and yellow, the analysis component 136 may identify those colors and generate metadata indicating a textual representation of those colors. The symbol data may be utilized to generate metadata indicating that there is at least one symbol in the mark, identifying the symbol, and/or generate a textual representation of the symbol. For example, if the mark includes a "peace sign," the metadata may include an identifier of the peace sign and/or may include a textual representation of the symbol, specifically "peace sign." Computer vision may be utilized for the symbol detection, in examples. The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. For sound recognition, automatic speech recognition and/or natural language understanding techniques may be utilized. In other examples where the sound does not include speech or when sounds other than speech are present, a modeling approach may be utilized where audio data representing the sounds may be generated and an audio signature of the audio data may be generated. The audio signature may be compared to reference audio signatures of reference sounds to determine what sounds are included in the given audio data.

The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning collectively than the element individually. For example, a mark with an image of a baby goat and a stone, when combined, may mean "you rock," even though those terms are not present in the mark. Some or all of this metadata may be formatted such that the vector component may utilize the metadata to generate a vector representation of the mark. In these examples, a reference database of acronyms may be queried and/or a model may be trained to identify acronyms from the text portion of a mark. Additionally, symbol meanings may be determined utilizing the techniques described herein, and natural language understanding techniques may be utilized to determine whether the combination of symbols is associated with a separate meaning apart from the individual symbols.

To generate a vector representation of the mark, the vector component 130 may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation of the mark in the vector space.

The vector component 130 may also be configured to generate a trademark breadth score. Such a breadth score may indicate how broad a claim of trademark rights is with respect to a registration of such a trademark. Factors for determining trademark breadth scores may include a number of goods and/or services claimed, a specificity level of the claimed goods and/or services, the presence of elements other than text in the mark, a prosecution history of the registration application, the presence of cancellation proceedings and/or opposition proceedings, etc.

In addition to generating a vector representation of the mark at issue, the vector component 130 may also generate a vector representation of the goods and/or services that are associated with the mark. To do so, the data representing the goods and/or services may be parsed from the data received from the data acquisition component 128. This data may include the description of goods and/or services from a trademark registration and/or trademark registration application, and/or the data may be determined from marketing data, product descriptions available to consumers, etc. The same or similar techniques as used to generate the vector representation of the mark may be utilized to generate the vector representation of the description of goods and/or services. As such the description vector representation may be generated and may be associated with a second location in the vector space.

The context component 132 may be configured to generate context data from the acquired data and to utilize the context data to inform generation of the vector representations. For example, the context component 132 may be utilized to determine that a portion of a registered mark has been disclaimed and thus should not be considered in and of itself as a portion of the mark at issue. Other context data indicating attributes of the mark and/or the goods or services may be utilized to more accurately determine what the mark and/or goods or services are. This context data may be utilized by the vector component 130 to generate the vector representations as described herein.

Once a vector representation of the mark and a vector representation of the description of goods and/or services are generated, the scoring component 134 may be configured to generate a numerical expression of the distinctiveness of the mark in association with its goods and/or services. The numerical expression may be a score, which may be placed on a scale. For example, a distinctiveness score scale may be set between 1 and 100, and the score for any given mark may be between or include 1 and 100. It should be understood that while this scale is utilized as an example here, it should not be considered as limiting. The numerical expression may be any numerical expression and the scale may be any scale. To determine the score, a distance between the first location of the mark vector representation and the second location of the description vector representation in the vector space may be determined. Shorter distances may indicate less favorable distinctiveness scores, while longer distances may indicate more favorable distinctiveness scores. For example, since the vector representations are representations of the mark and description, respectively, the more similar a mark is to its description of goods and/or services, the more similar the vector representations will be. To the contrary, when a mark differs drastically from its goods and services, the respective vector representations will also differ drastically. The scoring component 134 may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks.

In addition to the above score indicating the distance between the mark vector representation and the description vector representation, the scoring component 134 may also compute scores associated with the context data and/or may weight the distance-based score based at least in part on the context data. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark.

Once a trademark distinctiveness score is determined that score may be utilized for one or more purposes. By way of example, the recommendation component 140 may be configured to compare the trademark distinctiveness score to one or more score thresholds to determine whether a recommendation should be generated and sent. For example, a given trademark distinctiveness score may indicate that the mark is likely descriptive (or otherwise falls below a distinctiveness threshold) of the goods and/or services sold in connection with the mark. In this example, the recommendation component 140 may generate a recommendation that a change be made based at least in part on the trademark distinctiveness score. The change may be to change characteristics of the mark, to change the description of goods and/or services, and/or to change or otherwise update the context data that lead to the score. In examples, the recommendation may elaborate on options to increase the score and may provide functionality for a user to select to cause the recommended change to occur. In other examples, the analysis system may utilize the score to provide an indication of a likely classification of the trademark, such as whether the trademark is generic, descriptive, suggestive, and/or arbitrary or fanciful. In still other examples, a similar mark search may be performed utilizing the score and/or the mark vector representation. For example, the mark vector representation at issue may be utilized to identify similar mark vector representations for other marks. A comparison may be performed among these reference mark vector representations to determine how unique the mark is in association with other marks used in a given marketplace, in a given good/service classification, on a given trademark registration register, etc. In further examples, the mark vector representation may be utilized to perform a mark comparison with a given reference mark. For example, in a litigation situation where a likelihood of confusion is alleged as between two marks, vector representations of the two marks may be generated and compared to determine a similarity of the marks. A similar process may be performed for a similarity of the goods and/or services sold in connection with those marks. A similar process may also be performed with respect to trade channels for the marks. In still other examples, the distinctiveness score may be utilized to assess a strength of the mark, which may be useful in a litigation setting and also for purposes of valuing a trademark and the goodwill associated therewith.

The scoring component 134 may also be configured to generate distinctiveness scores associated with analysis of other trademarks. To do so, a vector representation of a trademark may be generated, and a vector representation of goods and/or services of the trademark may be generated. Additionally, as described herein, context data associated with the trademark may be gathered and utilized. This data may be utilized to determine a distinctiveness of the trademark with respect to its goods and/or services. In addition to this determination, an analysis of other trademarks may also be performed in conjunction with the trademark at issue. To do so, in examples, vector representations of the goods and/or services of other trademarks may be generated. For example, a database of trademarks may be maintained and/or accessed and some or all of the goods and/or services associated with these trademarks may be utilized to generate vector representations. These vector representations of the other trademarks may be compared to the vector representation of the goods and/or services of the trademark at issue. A subset of these other trademarks may be selected based at least on a degree of similarity as between the vector representation of the mark at issue and the reference vector representations of the goods and/or services of the other marks. For example, the vector representations may be plotted in a vector space and a distance between the vector of the mark at issue and the other vectors may be determined. When distances between vectors are shorter, that may indicate more similarity as between goods and/or services. When distances are longer, that may indicate less similarity as between goods and/or services. In other examples, vector aggregation techniques may be utilized as to the reference vectors to determine a centroid and/or common vector for groups of marks. Distances between the vector at issue and the group centroids may be utilized to determine the subset of marks to analyze further.

Once a subset of trademarks are identified as described above, or in some examples when a corpus of trademarks is identified, comparison of the trademark vector at issue may be performed with vector representations of the trademarks in the subset of trademarks. As described herein, a similarity metric may be generated that indicates a distance between the mark at issue and the other marks in the subset of marks. When at least one of the other marks is close in distance to the mark at issue, that may indicate that the mark's distinctiveness is less than if all vectors of the subset of the marks are a larger distance from the mark vector at issue. In some examples, instead of performing a comparison with only the subset of trademarks, the analysis of the subset of trademarks may be weighted more than other marks not in the subset of trademarks.

Utilizing some or all of the vector of the mark at issue, the vector of the goods and/or services at issue, the comparison of the mark to the goods and/or services, the context data, the similarity metric with other marks, the analysis of the subset of the marks, etc., a trained machine learning model 138 may be generated and utilized to determine distinctiveness scores. For example, as described in more detail herein, a machine learning model 138 may be trained utilizing a training dataset of some or all of the information described herein. The machine learning model 138 may also be trained based at least in part on outcome data that provides a ground truth for trademark distinctiveness. This ground truth data may include litigation-related data such as data indicating that a reference trademark is associated with a principal register of trademarks or a supplemental register of trademarks, data indicating whether a disclaimer is associated with the reference trademark, data indicating whether an affidavit of incontestability is associated with the reference trademark, and/or data indicating whether an affidavit of continuous use for a predetermined time is associated with the reference trademark. The training data may also include data indicating distinctiveness findings associated with litigation of a reference trademark, data indicating findings of famousness associated with the litigation, and/or data indicating outcomes of cancellation proceedings associated with the reference trademark. A trained machine learning model 138 may be generated and may utilize some or all of the data described herein to generate a trademark distinctiveness score for a given trademark. This distinctiveness score may be utilized for one or more purposes, including for litigation purposes, for brand selection purposes, for brand valuation purposes, for loan acquiring, for insurance purposes, etc. For example, as part of due diligence for acquiring a loan, such as an intellectual property secured loan, the distinctiveness score may be utilized to determine whether the loan should be issued, what level of diligence is to be performed, and/or terms of the loan such as loan amount, etc.

The user interfaces 126 may be configured to present data associated with the trademark distinctiveness scores described herein, and to present recommendations. When a recommendation is received as a user device 102, the recommendation may include a command that may cause the application 116 residing on the user device 102 to be enabled and to move to a foreground of the user device 102, such as without user input. Once enabled, the application 116 may be caused to display the recommendation along with functionality to allow for the user of the user device 102 to accept or reject the recommendation.

Some or all of the analyses described herein may be performed utilizing machine learning. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

As shown in FIG. 1, several of the components of the analysis system 104 and/or the other systems and devices, and the associated functionality of those components as described herein, may be performed by one or more of the other systems and/or by the user devices 102. Additionally, or alternatively, some or all of the components and/or functionalities associated with the user devices 102 may be performed by the analysis system 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 110 and/or 120, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or 120 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or 120 may possess its own local memory, which also may store program components, program data, and/or one or more operating systems.

The memory 114 and/or 124 may include volatile and nonvolatile memory, removable and non-removable media implemented in any method or technology for storage of information, such as computer-readable instructions, data structures, program component, or other data. Such memory 114 and/or 124 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 and/or 132 may be implemented as computer-readable storage media ("CRSM"), which may be any available physical media accessible by the processor(s) 110 and/or 120 to execute instructions stored on the memory 114 and/or 124. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or 124, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112 and/or 122 may enable messages between the components and/or devices shown in system 100 and/or with one or more other remote systems, as well as other networked devices. Such network interface(s) 112 and/or 122 may include one or more network interface controllers (NICs) or other types of transceiver devices to send and receive messages over the network 108.

For instance, each of the network interface(s) 112 and/or 122 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or 122 may include a wide area network (WAN) component to enable message over a wide area network.

In some instances, the analysis system 104 may be local to an environment associated the device 102. For instance, the analysis system 104 may be located within the device 102. In some instances, some or all of the functionality of the analysis system 104 may be performed by the device 102. Also, while various components of the analysis system 104 have been labeled and named in this disclosure and each component has been described as being configured to cause the processor(s) to perform certain operations, it should be understood that the described operations may be performed by some or all of the components and/or other components not specifically illustrated.

Figure 2:
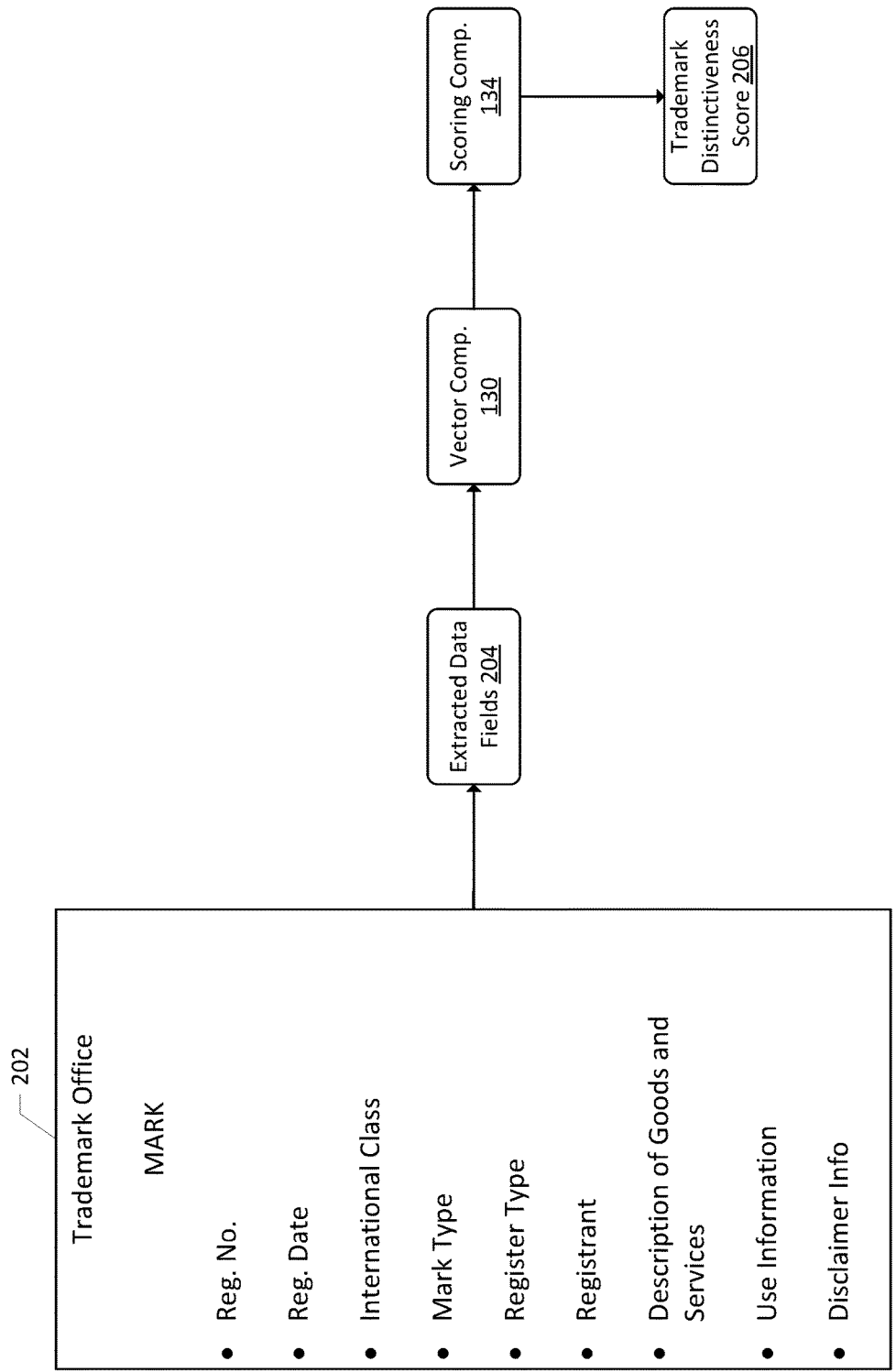
FIG. 2 illustrates a conceptual diagram of details associated with generating a trademark distinctiveness score from extracted data and data vector representations.

FIG. 2 illustrates a conceptual diagram of details associated with generating a trademark distinctiveness score from extracted data and data vector representations. FIG. 2 depicts a representation of a trademark registration 202. Also included in FIG. 2 are components similar to those described with respect to FIG. 1, such as a vector component 130 and/or a scoring component 134. FIG. 2 also includes data blocks representing extracted data fields 204 and/or trademark distinctiveness scores 206. Each of these components will be described in detail below.

For example, the trademark registration 202 may be one type of trademark-related data that may be queried and received from one or more databases associated with a remote system, such as a publicly-available database associated with a given trademark office. As shown in FIG. 2, the trademark registration may include, for a given trademark, the mark at issue, a description of the goods and/or services sold in connection with the mark, and contextual data associated with the trademark, such as a registration number, an application number, a registration date, an application date, a classification of the goods and/or services, a mark type, a register type, a registrant name, a registrant address or other contact identifier, mark use information, disclaimer information, as well as file wrapper information indicating documents that have been filed in association with a trademark application, including whether declarations of continuous use and/or of incontestability have been filed. It should be understood that this information is provided by way of example and other information may be provided by the trademark registration.

Data representing the trademark registration 202 and/or a trademark registration application may be received and the extracted data fields 204 may be generated. For example, when the registration 202 is received, it may not be received in a format that indicates what portions of the data correspond to the various components of the registration 202. As such, textual recognition techniques may be utilized to identify the data fields associated with the various types of data for the registration 202. For example, a data field for the mark may be identified and the data associated with that field may be determined to be the trademark at issue. The same process may be performed with respect to the description of goods and/or services, as well as the other data types associated with the registration 202.

Thereafter, the vector component 130 may utilize the extracted data fields 204 to generate a vector representation for the mark and for the description of goods and/or services. For example, the vector component 130 may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

To generate a vector representation of the mark, the vector component 130 may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation of the mark in the vector space.

In addition to generating a vector representation of the mark at issue, the vector component 130 may also generate a vector representation of the goods and/or services that are associated with the mark. To do so, the data representing the goods and/or services may be parsed from the data received from a data acquisition component. This data may include the description of goods and/or services from a trademark registration and/or trademark registration application, and/or the data may be determined from marketing data, product descriptions available to consumers, etc. The same or similar techniques as used to generate the vector representation of the mark may be utilized to generate the vector representation of the description of goods and/or services. As such the description vector representation may be generated and may be associated with a second location in the vector space.

Once a vector representation of the mark and a vector representation of the description of goods and/or services are generated, the scoring component 134 may be configured to generate a numerical expression of the distinctiveness of the mark in association with its goods and/or services. The numerical expression may be a score, which may be placed on a scale. For example, a distinctiveness score scale may be set between 1 and 100, and the score for any given mark may be between or include 1 and 100. It should be understood that while this scale is utilized as an example here, it should not be considered as limiting. The numerical expression may be any numerical expression and the scale may be any scale. To determine the score, a distance between the first location of the mark vector representation and the second location of the description vector representation in the vector space may be determined. Shorter distances may indicate less favorable distinctiveness scores, while longer distances may indicate more favorable distinctiveness scores. For example, since the vector representations are representations of the mark and description, respectively, the more similar a mark is to its description of goods and/or services, the more similar the vector representations will be. To the contrary, when a mark differs drastically from its goods and services, the respective vector representations will also differ drastically. The scoring component 134 may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks. The generated numerical expression of distinctiveness may be the trademark distinctiveness score 206, which may be utilized for one or more purposes as described more fully elsewhere herein.

Figure 3A:
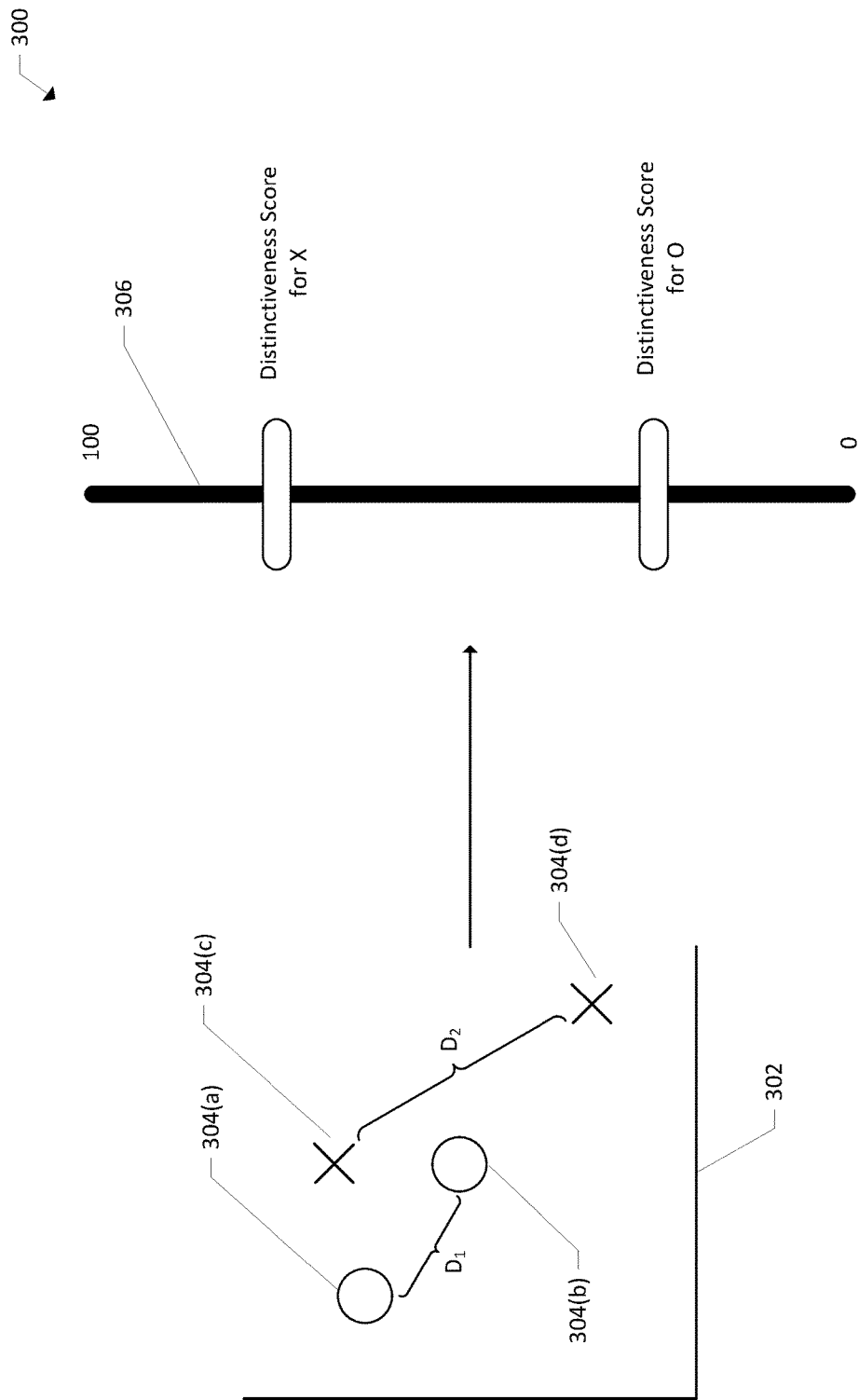
FIG. 3A illustrates a conceptual diagram of an example vector space with vector representations and how those vector representations are utilized to generate distinctiveness scores.

FIG. 3A illustrates a conceptual diagram of an example vector space 302 with vector representations 304(a)-(d) and how those vector representations are utilized to generate distinctiveness scores.

For example, as described in more detail above, data associated with trademarks may be acquired and that data may be utilized to generate one or more vector representations of the data. A vector component of the analysis system described herein may be configured to receive the acquired data from a data acquisition component and to generate one or more vector representations of the data. For example, the vector component may first parse the acquired data to determine which portion of the data represents the trademark at issue. To do so, field identifiers may be generated and utilized to identify which portions of the data represent the various information described above. Once the vector component determines which portion of the data represents the trademark at issue, the vector component may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, an analysis component of the system may generate metadata to associate with the trademark that defines the various components of the trademark in a way that the vector component can utilize to generate a vector representation of the trademark. For example, the analysis component may take the image data and may generate text data indicating attributes of the image at issue, such as identification of objects depicted in the image and descriptions of those objects. To do so, computer vision techniques may be utilized as described in more detail below. Additionally, the analysis component may utilize the color data to generate a textual representation of the colors at issue. For example, when the mark includes the colors blue, red, and yellow, the analysis component may identify those colors and generate metadata indicating a textual representation of those colors. The symbol data may be utilized to generate metadata indicating that there is at least one symbol in the mark, identifying the symbol, and/or generate a textual representation of the symbol. For example, if the mark includes a "peace sign," the metadata may include an identifier of the peace sign and/or may include a textual representation of the symbol, specifically "peace sign." The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning collectively than the element individually. For example, a mark with an image of a baby goat and a stone, when combined, may mean "you rock," even though those terms are not present in the mark. Some or all of this metadata may be formatted such that the vector component may utilize the metadata to generate a vector representation of the mark.

To generate a vector representation 304(a) of the mark, the vector component may be configured to utilize one or more data analysis techniques and modeling techniques to convert the various data forms associated with the mark into a vector representation 304(a) associated with a vector space. For example, the vector representation 304(a) may include a two or three-dimensional indication of a location of the vector representation 304(a) in the vector space 302. The techniques to generate the vector representation 304(a)

may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation 304(a) of the mark in the vector space 302.

In addition to generating a vector representation 304(a) of the mark at issue, the vector component may also generate a vector representation 304(b) of the goods and/or services that are associated with the mark. To do so, the data representing the goods and/or services may be parsed from the data received from the data acquisition component. This data may include the description of goods and/or services from a trademark registration and/or trademark registration application, and/or the data may be determined from marketing data, product descriptions available to consumers, etc. The same or similar techniques as used to generate the vector representation 304(a) of the mark may be utilized to generate the vector representation 304(b) of the description of goods and/or services. As such, the description vector representation 304(b) may be generated and may be associated with a second location in the vector space 302.

Using FIG. 3A as an example, a first mark vector representation 304(a) and a first description vector representation 304(b) are shown as "Os" within the vector space 302. Additionally, a second mark vector representation 304(c) and a second description vector representation 304(d) are shown as "Xs" within the vector space 302. Note that a distance, $D_1$, between the first mark vector representation 304(a) and the first description vector representation 304(b) is shorter than the distance, $D_2$, between the second mark vector representation 304(c) and the second description vector representation 304(d). This may indicate that the first mark is more similar to its associated description of goods and/or services than the similarity between the second mark and its associated description. This may indicate that the first mark is less distinctive than the second mark. To quantify these degrees of distinctiveness, a scoring component may be utilized.

For example, once the vector representations 304(a), 304(c) of the mark and the vector representations 304(b), 304(d) of the description of goods and/or services are generated, the scoring component may be configured to generate a numerical expression of the distinctiveness of the mark in association with its goods and/or services. The numerical expression may be a score, which may be placed on a scale 306. For example, a distinctiveness score scale may be set between 1 and 100, and the score for any given mark may be between or include 1 and 100. It should be understood that while this scale 306 is utilized as an example here, it should not be considered as limiting. The numerical expression may be any numerical expression and the scale may be any scale. To determine the score, a distance between the first location of the mark vector representation 304(a), 304(c) and the second location of the description vector representation 304(b), 304(d) in the vector space 302 may be determined. Shorter distances may indicate less favorable distinctiveness scores, while longer distances may indicate more favorable distinctiveness scores. For example, since the vector representations are representations of the mark and description, respectively, the more similar a mark is to its description of goods and/or services, the more similar the vector representations will be. To the contrary, when a mark differs drastically from its goods and services, the respective vector representations will also differ drastically. The scoring component may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks.

In addition to the above score indicating the distance between the mark vector representation and the description vector representation, the scoring component may also compute scores associated with the context data and/or may weight the distance-based score based at least in part on the context data. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark. As shown in FIG. 3A, the distinctiveness score for the mark associated with the "Xs" in the vector 302 has been given a better distinctiveness score than the mark associated with the "Os," indicating that the first mark is more distinctive than the second mark.

Figure 3B:
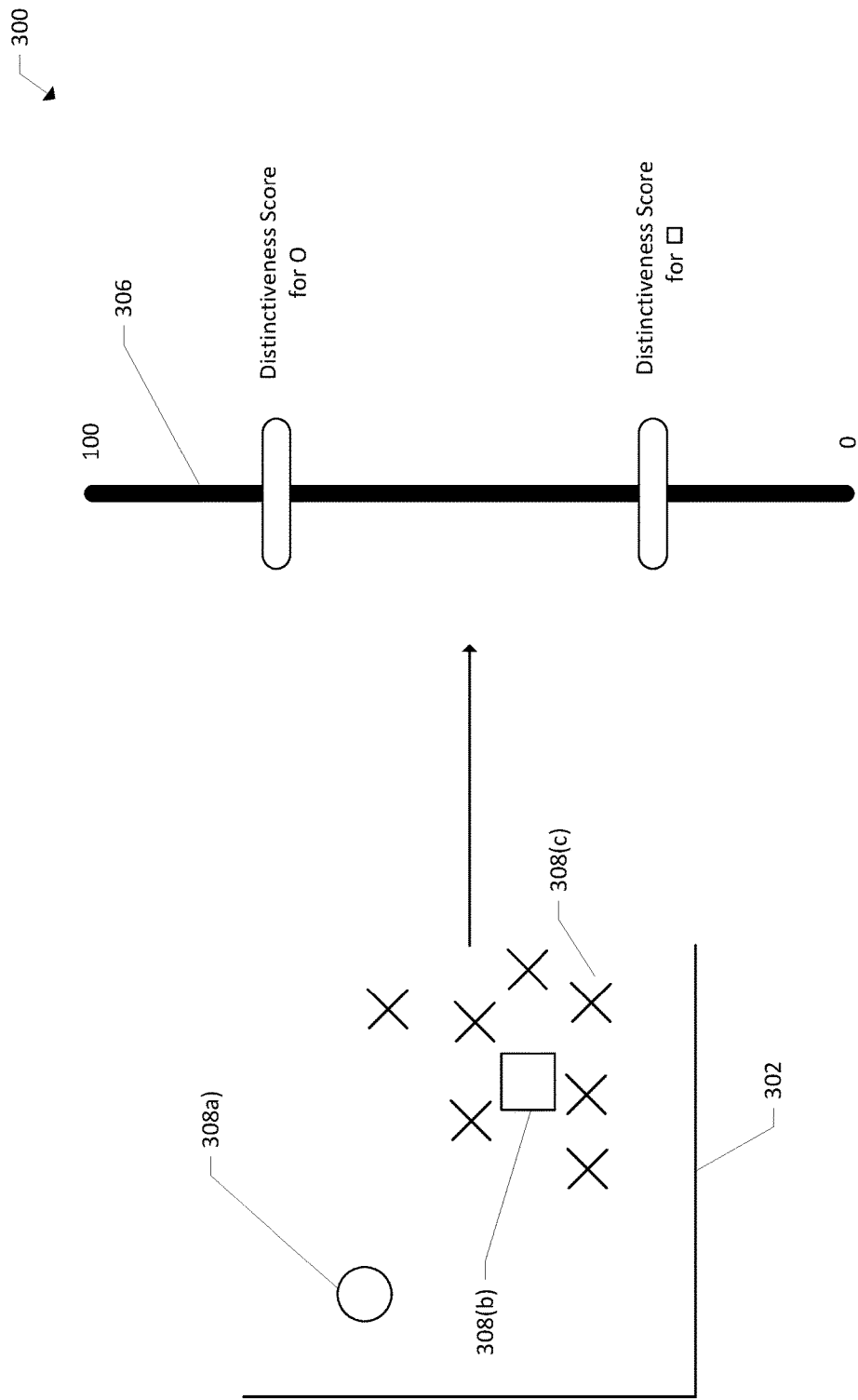
FIG. 3B illustrates a conceptual diagram of an example vector space with vector representations of various trademarks and how those vector representations are utilized to generate distinctiveness scores.

FIG. 3B illustrates a conceptual diagram of an example vector space 302 with vector representations of various trademarks and how those vector representations are utilized to generate distinctiveness scores.

For example, as described in more detail above, data associated with trademarks may be acquired and that data may be utilized to generate one or more vector representations of the data. A vector component of the analysis system described herein may be configured to receive the acquired data from a data acquisition component and to generate one or more vector representations of the data. For example, the vector component may first parse the acquired data to determine which portion of the data represents the trademark at issue. To do so, field identifiers may be generated and utilized to identify which portions of the data represent the various information described above. Once the vector component determines which portion of the data represents the trademark at issue, the vector component may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, an analysis component of the system may generate metadata to associate with the trademark that defines the various components of the trademark in a way that the vector component can utilize to generate a vector representation of the trademark. For example, the analysis component may take the image data and may generate text data indicating attributes of the image at issue, such as identification of objects depicted in the image and descriptions of those objects. To do so, computer vision techniques may be utilized as described in more detail below. Additionally, the analysis component may utilize the color data to generate a textual representation of the colors at issue. For example, when the mark includes the colors blue, red, and yellow, the analysis component may identify those colors and generate metadata indicating a textual representation of those colors. The symbol data may be utilized to generate metadata indicating that there is at least one symbol in the mark, identifying the symbol, and/or generate a textual representation of the symbol. For example, if the mark includes a "peace sign," the metadata may include an identifier of the peace sign and/or may include a textual representation of the symbol, specifically "peace sign." The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning collectively than the element individually. For example, a mark with an image of a baby goat and a stone, when combined, may mean "you rock," even though those terms are not present in the mark. Some or all of this metadata may be formatted such that the vector component may utilize the metadata to generate a vector representation of the mark.

To generate a vector representation 308(a) of the mark, the vector component may be configured to utilize one or more data analysis techniques and modeling techniques to convert the various data forms associated with the mark into a vector representation 308(a) associated with a vector space. For example, the vector representation 308(a) may include a two or three-dimensional indication of a location of the vector representation 308(a) in the vector space 302. The techniques to generate the vector representation 308(a) may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation 308(a) of the mark in the vector space 302.

In addition to generating a vector representation 308(a) of the mark at issue, the vector component may also generate a vector representation 308(c) of other trademarks. As described herein, a subset of other trademarks may be determined and each of the trademarks may be vectorized. In the example of FIG. 3B, a number of other trademarks may be vectorized, which are depicted as the "Xs" within the vector space 302. A first mark at issue is represented by the first vector representation 308(a). In this example, the distance between the first vector representation 308(a) and the other vector representations 308(c) is larger than the distance between a second vector representation 308(b) of another mark at issue and the other vector representations 308(c). As such, the first mark represented by the vector representation 308(a) may be considered more distinct or otherwise be given a similarity metric indicating less similarity than the second mark represented by the vector representation 308(b).

A numerical expression of the similarity metric may be a score, which may be placed on a scale 306. For example, a distinctiveness score scale may be set between 1 and 100, and the score for any given mark may be between or include 1 and 100. It should be understood that while this scale 306 is utilized as an example here, it should not be considered as limiting. The numerical expression may be any numerical expression and the scale may be any scale. Shorter distances may indicate less favorable distinctiveness scores, while longer distances may indicate more favorable distinctiveness scores. The scoring component may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks.

In addition to the above score indicating the distance between the mark vector representations, the scoring component may also compute scores associated with the context data and/or may weight the distance-based score based at least in part on the context data. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark.

FIG. 4 illustrates a conceptual diagram of how an analysis component of the system described herein determines features of a trademark and generates a vector representation. FIG. 4 may include some of the same components as described with respect to FIG. 1. For example, FIG. 4 may include a vector component 130 and/or an analysis component 136. Additionally, FIG. 4 may include data representing a design mark 402 or otherwise a trademark that includes more than just text, as well as components of the design mark 402 as determined by the analysis component 136. These components will be described in more detail below. Ultimately, the components of the design mark 402 may be analyzed by the vector component 130 to generate a vector representation 416 of the mark in question.

To illustrate, a data acquisition component of the analysis system may receive data representing the design mark 402. As used herein, a design mark 402 may be any portion of a brand, such as a trademark, that includes more than just text or text data. In these examples, the mark may include image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, the analysis component 136 may generate metadata to associate with the trademark that defines the various components of the trademark in a way that the vector component 130 can utilize to generate a vector representation of the trademark. For example, the analysis component 136 may determine a text portion 404 of the mark utilizing optical character recognition or other text recognition techniques. The analysis component 136 may also take the image data for a mark and may generate text data indicating attributes of the image at issue, such as identification of objects depicted in the image and descriptions of those objects. To do so, computer vision techniques may be utilized. This image portion 408 of the mark may be identified for the vector component 130.

Additionally, the analysis component 136 may utilize color data to generate a textual representation of the colors at issue and thus to identify a color portion 406 of the mark. For example, when the mark includes the colors blue, red, and yellow, the analysis component 136 may identify those colors and generate metadata indicating a textual representation of those colors. The symbol data may be utilized to generate metadata indicating that there is at least one symbol 410 in the mark, identifying the symbol 410, and/or generate a textual representation of the symbol 410. For example, if the mark includes a "peace sign," the metadata may include an identifier of the peace sign and/or may include a textual representation of the symbol 410, specifically "peace sign." Computer vision may be utilized for the symbol detection, in examples. The sound data may be utilized to generate metadata indicating lyrics, if any, in the sound portion 412 of the mark, given instrument noises, and/or other noises included in the sound portion 412. For example, if the sound data is of a spring decompressing to make a "boing" sound, metadata may be generated indicating that the sound data includes this noise. For sound recognition, automatic speech recognition and/or natural language understanding techniques may be utilized. In other examples where the sound does not include speech or when sounds other than speech are present, a modeling approach may be utilized where audio data representing the sounds may be generated and an audio signature of the audio data may be generated. The audio signature may be compared to reference audio signatures of reference sounds to determine what sounds are included in the given audio data.

The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning 414 collectively than the element individually. For example, a mark with an image of a baby goat and a stone, when combined, may mean "you rock," even though those terms are not present in the mark. Some or all of this metadata may be formatted such that the vector component 130 may utilize the metadata to generate a vector representation 416 of the mark. In these examples, a reference database of acronyms may be queried and/or a model may be trained to identify acronyms from the text portion of a mark. Additionally, symbol meanings 414 may be determined utilizing the techniques described herein, and natural language understanding techniques may be utilized to determine whether the combination of symbols is associated with a separate meaning 414 apart from the individual symbols.

To generate a vector representation of the mark, the vector component 130 may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation of the mark in the vector space.

Figure 5:
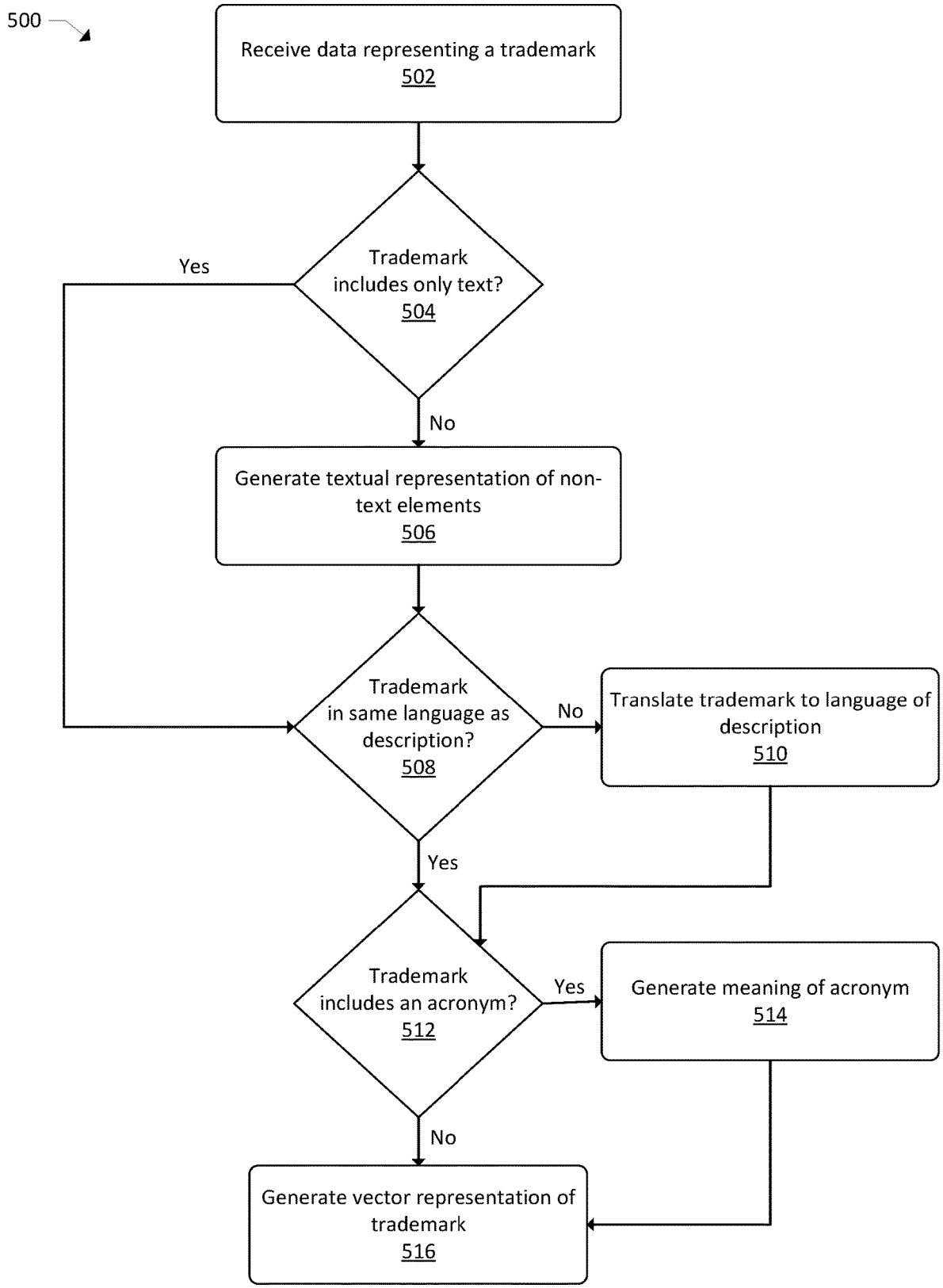
FIG. 5 illustrates a flow diagram of an example process for identifying components of a trademark for vector representation generation.

FIG. 5 illustrates processes associated with dataset distinctiveness modeling. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 6-11, although the processes may be implemented in a wide variety of other environments, architectures and systems.

FIG. 5 illustrates a flow diagram of an example process 500 for identifying components of a trademark for vector representation generation. The order in which the operations or steps are described is not intended to be construed as a limitation, and any number of the described operations may be combined in any order and/or in parallel to implement process 500. The operations described with respect to the process 400 are described as being performed by a client device, and/or a system associated with the document analysis platform. However, it should be understood that some or all of these operations may be performed by some or all of components, devices, and/or systems described herein.

At block 502, the process 500 may include receiving data representing a trademark. To do so, a data acquisition component of an analysis system may acquire data associated with a trademark to be evaluated for distinctiveness. The acquired data may be received from one or more remote systems that include one or more databases of information. For example, a given database may store data indicating trademark registrations and/or trademark registration applications. This data may include, for a given trademark, the mark at issue, a description of the goods and/or services sold in connection with the mark, and contextual data associated with the trademark, such as a registration number, an application number, a registration date, an application date, a classification of the goods and/or services, a mark type, a register type, a registrant name, a registrant address or other contact identifier, mark use information, disclaimer information, as well as file wrapper information indicating documents that have been filed in association with a trademark application, including whether declarations of continuous use and/or of incontestability have been filed. Additionally, one or more other databases may be queried for information associated with a trademark that is not necessarily present in a trademark registration or trademark application. Such information may include information associated with the registrant/applicant, other trademarks utilized in association with the trademark at issue, evidence of use in commerce, litigation data, data indicating a degree of saturation of similar marks, and/or other factors that may impact trademark distinctiveness. It should be understood that identification of such factors and/or the weighting of such factors as described more fully herein may be determined utilizing machine learning techniques where a machine learning model is trained to identify when certain data negatively or positively impacts trademark distinctiveness and to what degree.

At block 504, the process 500 may include determining whether the trademark includes only text. For example, an analysis component of the system may analyze the data representing the trademark and may determine whether the mark includes only text data.

In examples where the trademark does not include only text, the process 500 may include, at block 506, generating a textual representation of the non-text elements of the trademark. For example, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, an analysis component of the system may generate metadata to associate with the trademark that defines the various components of the trademark in a way that the vector component can utilize to generate a vector representation of the trademark. For example, the analysis component may take the image data and may generate text data indicating attributes of the image at issue, such as identification of objects depicted in the image and descriptions of those objects. To do so, computer vision techniques may be utilized as described in more detail below. Additionally, the analysis component may utilize the color data to generate a textual representation of the colors at issue. For example, when the mark includes the colors blue, red, and yellow, the analysis component may identify those colors and generate metadata indicating a textual representation of those colors. The symbol data may be utilized to generate metadata indicating that there is at least one symbol in the mark, identifying the symbol, and/or generate a textual representation of the symbol. For example, if the mark includes a "peace sign," the metadata may include an identifier of the peace sign and/or may include a textual representation of the symbol, specifically "peace sign." The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. The meaning data may be utilized to generate metadata indicating that while a given mark does not include certain words, phrases, or otherwise elements, the mark includes something that means those words, phrases, or otherwise. An example of this would be when a combination of the elements of the mark indicate a different meaning collectively than the element individually. For example, a mark with an image of a baby goat and a stone, when combined, may mean "you rock," even though those terms are not present in the mark. Some or all of this metadata may be formatted such that the vector component may utilize the metadata to generate a vector representation of the mark.

In examples where the trademark only includes text, or after generating the textual representation of the non-text elements, at block 508, the process 500 may include determining whether the trademark is in the same language as the description of goods and/or services associated with the trademark. For example, one or more databases of words in various languages may be queried to determine which database includes a word or phrase that corresponds to the mark at issue. If the database with the correlating word or phrase is the same database that the words and phrases for the description of goods and/or services are found in, the system may determine that the trademark is in the same language as the description. If not, then the system may determine that the trademark is in a different language as the description. It should be understood that the system may determine that the entire trademark or just a portion of the trademark is in a different language from the description.

In examples where the trademark is not in the same language as the description of goods and/or services, the process 500 may include, at block 510, translating the trademark into the language of the description of goods and/or services. For example, the system may determine the language associated with the description of goods and/or services, and may utilize one or more techniques, including modeling and/or the use of APIs associated with a translation service, to generate text data representing a translated version of the trademark to a language that the description of goods and/or services is in.

In examples where the trademark is in the same language or after translating the trademark into the language of the description, at block 512, the process 500 may include determining whether the trademark includes an acronym. For example, text data associated with the mark may be analyzed to determine whether all or a portion of the text data is likely to correspond to an acronym. To do so, a reference database of acronyms may be queried. In other examples, a modeling approach may be utilized to determine whether a given portion of the text data of a mark corresponds to an acronym. This modeling approach may utilize factors such as capitalization, the use of punctuation, spelling, letter arrangement, etc. to determine whether a portion of the text data likely corresponds to an acronym.

In examples where the trademark includes an acronym, the process 500 may include, at block 514, generating a meaning of the acronym. For example, the meaning of the acronym may be determined from the queried database and/or the model, and text data representing that meaning may be associated with the trademark.

In examples where the trademark does not include an acronym or after generation of the meaning of the acronym, at block 516, the process 500 may include generating a vector representation of the trademark. To generate a vector representation of the mark, the vector component may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation of the mark in the vector space.

Figure 6:
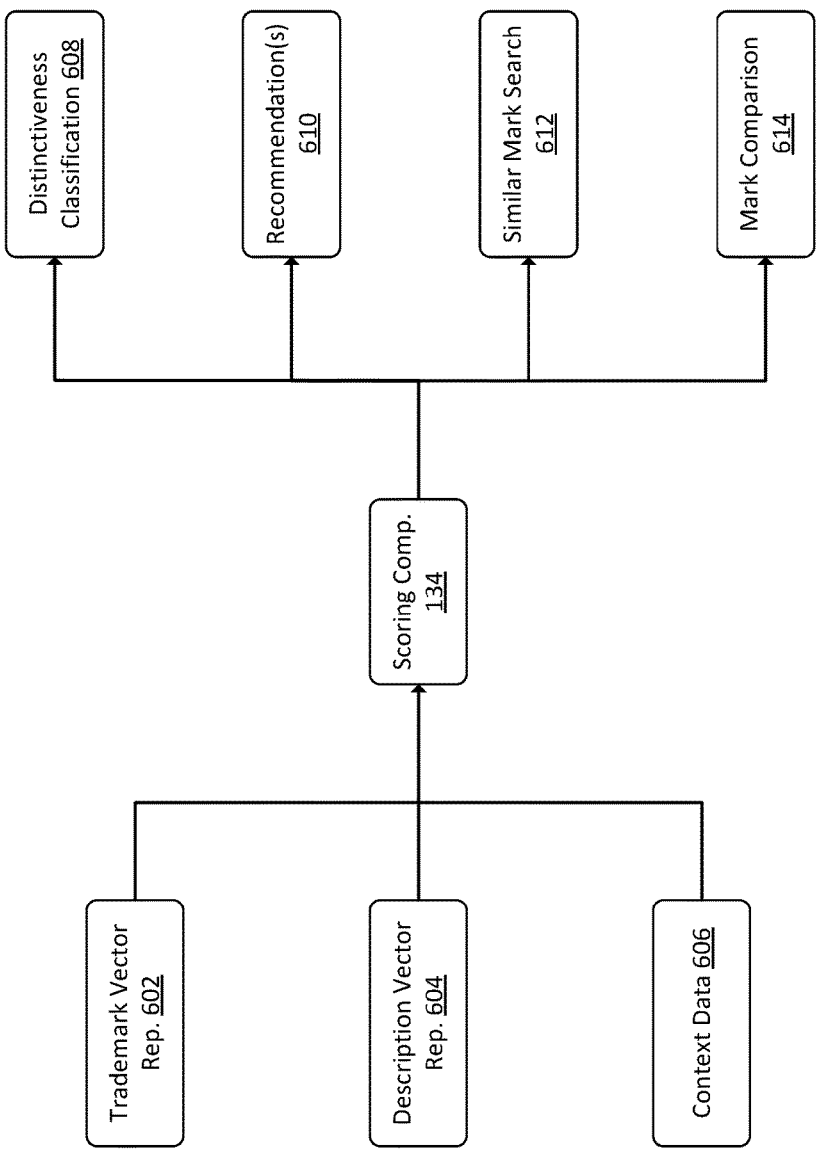
FIG. 6 illustrates a conceptual diagram of how a trademark distinctiveness score may be utilized.

FIG. 6 illustrates a conceptual diagram of how a trademark distinctiveness score may be utilized. FIG. 6 may have some of the same components as described with respect to FIG. 1. For example, FIG. 6 may include a scoring component 134. Additionally, FIG. 6 may include data representing a trademark vector representation 602, a description vector representation 604, and/or context data 606 that may be utilized by the scoring component 134 to generate a distinctiveness score. That distinctiveness score may be utilized for one or more purposes, including distinctiveness classification 608, generating one or more recommendations 610, performing a similar mark search 612, and/or perform a mark comparison 614, for example.

To illustrate, as described in more detail above, a vector component of an analysis system may generate the trademark vector representation 602. The trademark vector representation 602 may indicate a coordinate in a vector space where the vector representation 602 is situated. Additionally, the vector component may generate the description vector representation 604. The description vector representation 604 may indicate a coordinate in the vector space where the description vector representation 604 is situated. Additionally, the context data 606 may inform the generation of the vector representations and/or placement of the vector representations in the vector space.

Some or all of this data may be utilized by the scoring component 134 to generate a trademark distinctiveness score for the mark in question. For example, once a vector representation 602 of the mark and a vector representation 604 of the description of goods and/or services are generated, the scoring component 134 may be configured to generate a numerical expression of the distinctiveness of the mark in association with its goods and/or services. The numerical expression may be a score, which may be placed on a scale. For example, a distinctiveness score scale may be set between 1 and 100, and the score for any given mark may be between or include 1 and 100. It should be understood that while this scale is utilized as an example here, it should not be considered as limiting. The numerical expression may be any numerical expression and the scale may be any scale. To determine the score, a distance between the first location of the mark vector representation and the second location of the description vector representation in the vector space may be determined. Shorter distances may indicate less favorable distinctiveness scores, while longer distances may indicate more favorable distinctiveness scores. For example, since the vector representations are representations of the mark and description, respectively, the more similar a mark is to its description of goods and/or services, the more similar the vector representations will be. To the contrary, when a mark differs drastically from its goods and services, the respective vector representations will also differ drastically. The scoring component 134 may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks.

In addition to the above score indicating the distance between the mark vector representation and the description vector representation, the scoring component 134 may also compute scores associated with the context data and/or may weight the distance-based score based at least in part on the context data. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark.

Once a trademark distinctiveness score is determined that score may be utilized for one or more purposes. By way of example, distinctiveness classification 608 may be performed based at least in part on the trademark distinctiveness score. For example, threshold scores may be determined that demarcate a quantitative boundary between generic marks and descriptive marks, between descriptive marks and suggestive marks, between suggestive marks and arbitrary/fanciful marks, etc. The scoring component and/or another component of the analysis system may be configured to determine where the trademark distinctiveness score lies with respect to the scoring thresholds and may associate the trademark with the appropriate distinctiveness classification 608.

Additionally, a recommendation component may be configured to compare the trademark distinctiveness score to one or more score thresholds to determine whether a recommendation 610 should be generated and sent. For example, a given trademark distinctiveness score may indicate that the mark is likely descriptive (or otherwise falls below a distinctiveness threshold) of the goods and/or services sold in connection with the mark. In this example, the recommendation component may generate a recommendation 610 that a change be made based at least in part on the trademark distinctiveness score. The change may be to change characteristics of the mark, to change the description of goods and/or services, and/or to change or otherwise update the context data that lead to the score. In examples, the recommendation 610 may elaborate on options to increase the score and may provide functionality for a user to select to cause the recommended change to occur.

In still other examples, a similar mark search 612 may be performed utilizing the score and/or the mark vector representation. For example, the mark vector representation at issue may be utilized to identify similar mark vector representations for other marks. A comparison may be performed among these reference mark vector representations to determine how unique the mark is in association with other marks used in a given marketplace, in a given good/service classification, on a given trademark registration register, etc. By so doing, the system may be able to determine whether a given mark, even if distinctive with respect to its goods and/or services, will be distinctive with respect to other similarly-situated brands used in commerce.

In further examples, the mark vector representation may be utilized to perform a mark comparison 614 with a given reference mark. For example, in a litigation situation where a likelihood of confusion is alleged as between two marks, vector representations of the two marks may be generated and compared to determine a similarity of the marks. A similar process may be performed for a similarity of the goods and/or services sold in connection with those marks. A similar process may also be performed with respect to trade channels for the marks. In still other examples, the distinctiveness score may be utilized to assess a strength of the mark, which may be useful in a litigation setting and also for purposes of valuing a trademark and the goodwill associated therewith.

In addition, the mark comparison 614 may result in the trademark distinctiveness score discussed herein. For example, an analysis of other trademarks may also be performed in conjunction with the trademark at issue. To do so, in examples, vector representations of the goods and/or services of other trademarks may be generated. For example, a database of trademarks may be maintained and/or accessed and some or all of the goods and/or services associated with these trademarks may be utilized to generate vector representations. These vector representations of the other trademarks may be compared to the vector representation of the goods and/or services of the trademark at issue. A subset of these other trademarks may be selected based at least on a degree of similarity as between the vector representation of the mark at issue and the reference vector representations of the goods and/or services of the other marks. For example, the vector representations may be plotted in a vector space and a distance between the vector of the mark at issue and the other vectors may be determined. When distances between vectors are shorter, that may indicate more similarity as between goods and/or services. When distances are longer, that may indicate less similarity as between goods and/or services. In other examples, vector aggregation techniques may be utilized as to the reference vectors to determine a centroid and/or common vector for groups of marks. Distances between the vector at issue and the group centroids may be utilized to determine the subset of marks to analyze further.

Once a subset of trademarks are identified as described above, or in some examples when a corpus of trademarks is identified, comparison of the trademark vector at issue may be performed with vector representations of the trademarks in the subset of trademarks. As described herein, a similarity metric may be generated that indicates a distance between the mark at issue and the other marks in the subset of marks. When at least one of the other marks is close in distance to the mark at issue, that may indicate that the mark's distinctiveness is less than if all vectors of the subset of the marks are a larger distance from the mark vector at issue. In some examples, instead of performing a comparison with only the subset of trademarks, the analysis of the subset of trademarks may be weighted more than other marks not in the subset of trademarks.

Utilizing some or all of the vector of the mark at issue, the vector of the goods and/or services at issue, the comparison of the mark to the goods and/or services, the context data, the similarity metric with other marks, the analysis of the subset of the marks, etc., a trained machine learning model may be generated and utilized to determine distinctiveness scores. For example, as described in more detail herein, a machine learning model may be trained utilizing a training dataset of some or all of the information described herein. The machine learning model may also be trained based at least in part on outcome data that provides a ground truth for trademark distinctiveness. This ground truth data may include litigation-related data such as data indicating that a reference trademark is associated with a principal register of trademarks or a supplemental register of trademarks, data indicating whether a disclaimer is associated with the reference trademark, data indicating whether an affidavit of incontestability is associated with the reference trademark, and/or data indicating whether an affidavit of continuous use for a predetermined time is associated with the reference trademark. The training data may also include data indicating distinctiveness findings associated with litigation of a reference trademark, data indicating findings of famousness associated with the litigation, and/or data indicating outcomes of cancellation proceedings associated with the reference trademark. A trained machine learning model may be generated and may utilize some or all of the data described herein to generate a trademark distinctiveness score for a given trademark. This distinctiveness score may be utilized for one or more purposes, including for litigation purposes, for brand selection purposes, for brand valuation purposes, for loan acquiring, for insurance purposes, etc. For example, as part of due diligence for acquiring a loan, such as an intellectual property secured loan, the distinctiveness score may be utilized to determine whether the loan should be issued, what level of diligence is to be performed, and/or terms of the loan such as loan amount, etc.

Figure 7:
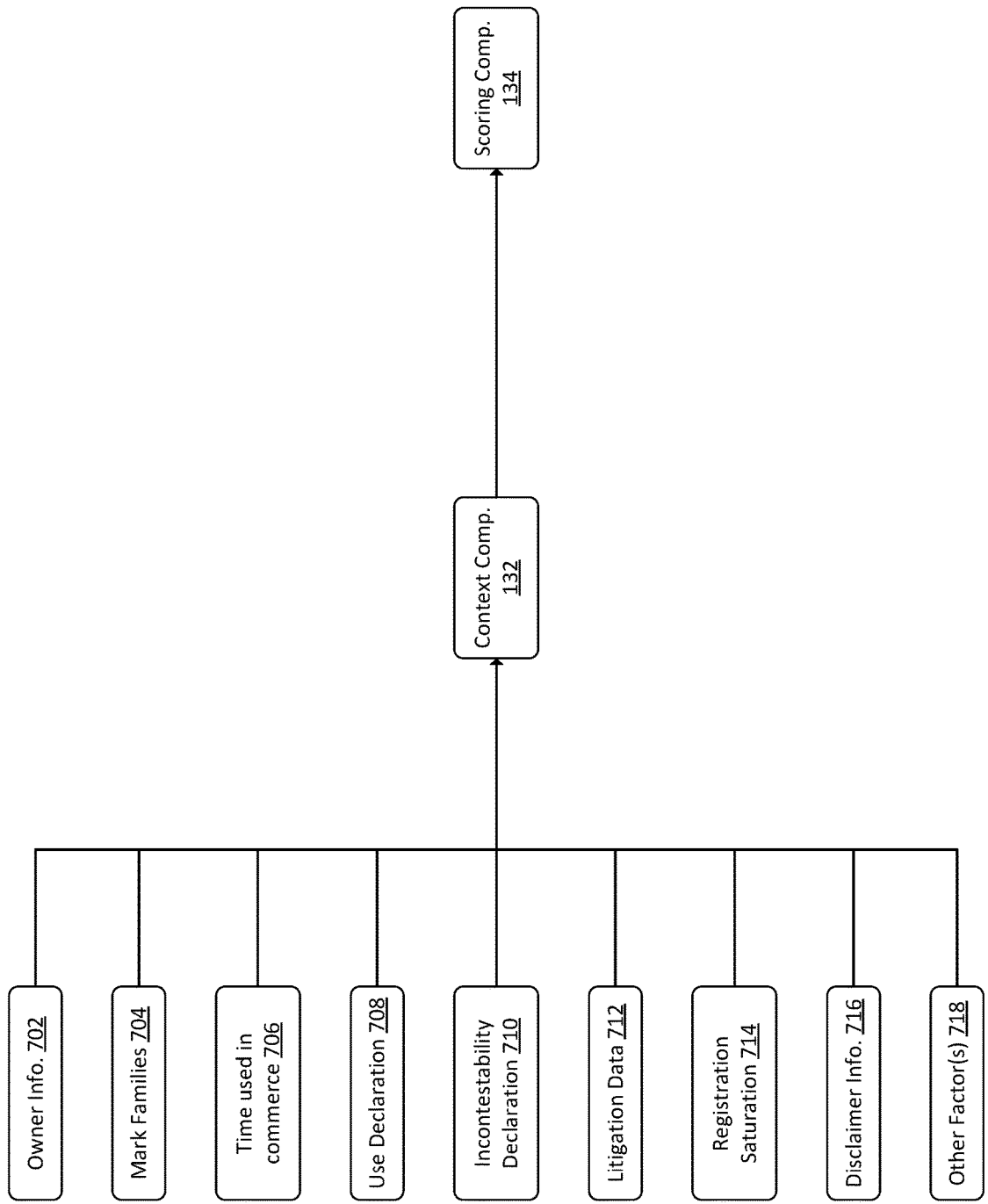
FIG. 7 illustrates a conceptual diagram of example data types that may be utilized to determine context data associated with a trademark.

FIG. 7 illustrates a conceptual diagram of example data types that may be utilized to determine context data associated with a trademark. FIG. 7 may include some of the same components as described with respect to FIG. 1. For example, FIG. 7 may include a context component 132 and/or a scoring component 134. FIG. 7 may also include one or more context data types that may be utilized by the context component 132 to inform scoring of dataset distinctiveness.

For example, the context data types may include owner information 702, mark families 704, time used in commerce 706, use declarations 708, incontestability declarations 710, litigation data 712, registration saturation 714, disclaimer information 716, and/or one or more other factors 718. With respect to the owner information 702, this data may indicate how recognizable the entity that owns the trademark is with respect to a given marketplace. For example, if the entity is not well known or otherwise has not been in business for very long or is not associated with revenue data indicating an appreciable amount of the consuming public recognizes the owner, then such data may indicate that the mark should not be favorably weighted with respect to its distinctiveness. To the contrary, if the entity is well known, this may indicate that the mark will be treated as being more distinctive in the marketplace. Data associated with social media platforms may be utilized to inform the owner information 702 and/or other types of context data as described herein. With respect to the mark families 704, if a mark is part of a mark family, particularly where at least a portion of the marks in the family have been used in commerce for a long period of time or data indicates that consumers frequently purchase goods and/or services in connection with family marks, this may indicate that the mark will be treated as being more distinctive in the marketplace. The time used in commerce 706 may also be a strong indicator of mark distinctiveness, particularly for concluding that a mark has acquired distinctiveness through continued use in commerce for a long period of time, such as five years. The use declarations 708 and incontestability declarations 710 may also be utilized to weight distinctiveness more heavily toward a favorable score given the legal implications of these declarations (or affidavits) being filed with a given trademark office.

With respect to the litigation data 712, this data may be utilized to determine whether the mark in question has been litigated and/or whether litigation has occurred with respect to a similarly-situated mark. When that litigation resulted in a favorable outcome associated with mark distinctiveness, this may positively impact the trademark distinctiveness score. When that litigation resulted in a negative outcome, this may negatively impact the trademark distinctiveness score. With respect to the registration saturation 714, this data may indicate that while a mark may be distinctive with respect to its goods and/or services, similar marks may be present on a trademark register or otherwise in the marketplace. This registration saturation 714 may negatively impact the trademark distinctiveness score. With respect to the disclaim information 716, when a trademark is registered with a trade office, the registrant is sometimes required to disclaimer a portion of the mark as having a trademark meaning in and of itself. The system may weight the trademark distinctiveness score based at least in part on the presence of a disclaimer itself, generally negatively impacting the trademark distinctiveness score. Additionally, or alternatively, the system may weight the trademark distinctiveness score based at least in part on details of the disclaimer. For example, if the disclaimer is determined to be a minor part of the overall mark, qualitatively and/or quantitatively, then the negative weighting may be slight in comparison to if the disclaimer is for a primary portion of the mark. The other factors 718 may include any other data associated with the trademark, the goods and/or services, the owner, the market(s) at issue, etc. These other factors 718 may be determined utilizing machine learning techniques as described in more detail elsewhere herein.

The context component 132 may be configured to generate context data from the acquired data and to utilize the context data to inform generation of the vector representations. Additionally, the context data may be utilized by the scoring component 134 to weight or otherwise adjust the trademark distinctiveness score generated utilizing the distance between a mark vector representation and a description vector representation. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark.

FIGS. 8-13 illustrate processes associated with dataset distinctiveness modeling. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

Figure 8:
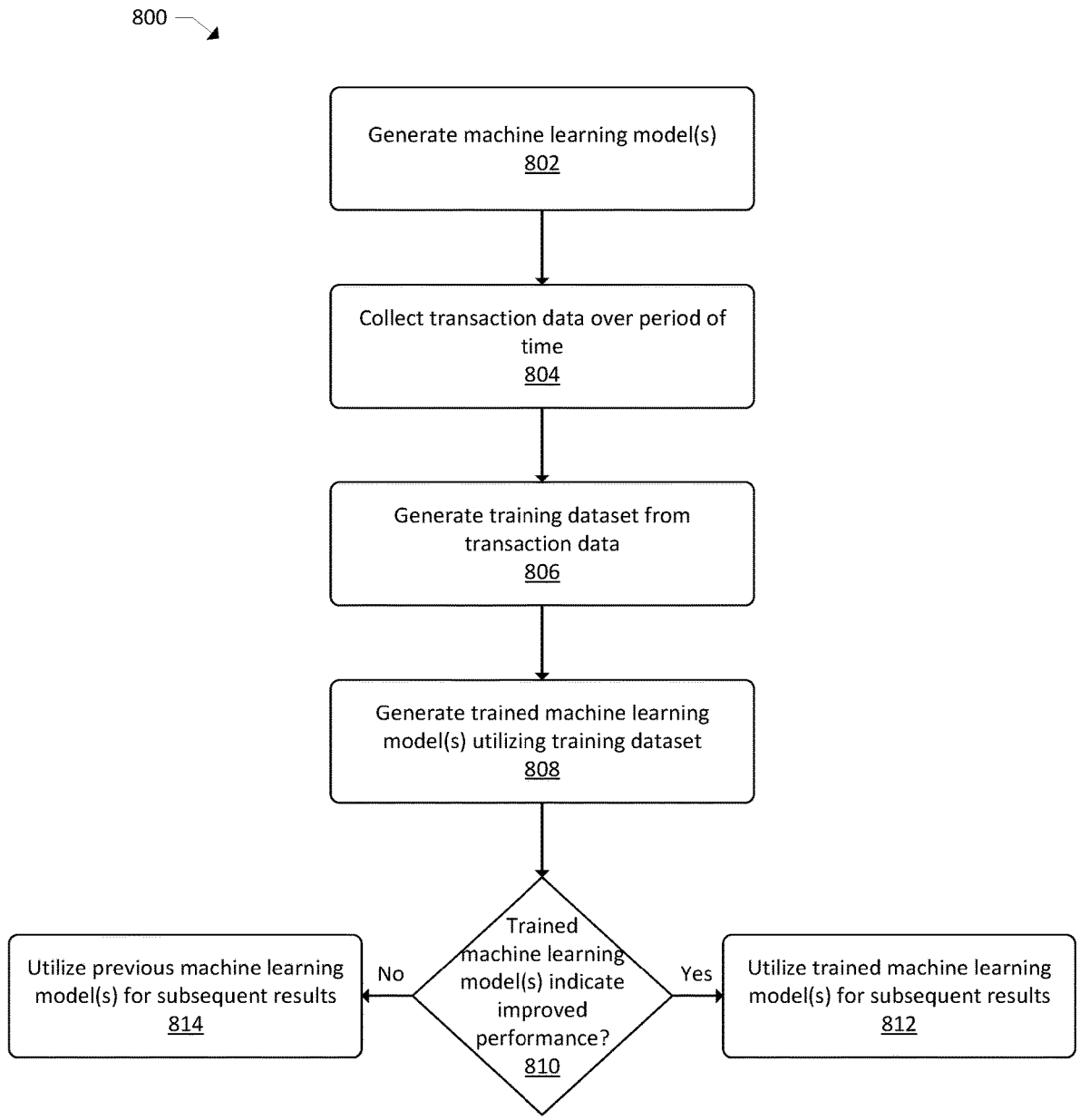
FIG. 8 illustrates a flow diagram of an example process for training one or more machine learning models in association with dataset distinctiveness modeling.

FIG. 8 illustrates a flow diagram of an example process 800 for training one or more machine learning models in association with intellectual property assessments. The order in which the operations or steps are described is not intended to be construed as a limitation, and any number of the described operations may be combined in any order and/or in parallel to implement process 800. The operations described with respect to the process 800 are described as being performed by a client device, and/or a system associated with the document analysis platform. However, it should be understood that some or all of these operations may be performed by some or all of components, devices, and/or systems described herein.

At block 802, the process 800 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 804, the process 800 may include collecting feedback data over a period of time. The feedback data may include information associated with trademark distinctiveness determinations, adjudications, etc. This information may include factors that contributed to the distinctiveness determinations and/or scores, such as information related to the prosecution history of the assets in question, data associated with the assets themselves, distinctiveness scores and/or sub-scores, recommendation acceptances, etc.

At block 806, the process 800 may include generating a training dataset from the feedback data. Generation of the training dataset may include formatting the feedback data into input vectors for the machine learning model to intake, as well as associating the various data with the distinctiveness outcomes.

At block 808, the process 800 may include generating one or more trained machine learning models utilizing the training dataset. Generation of the trained machine learning models may include updating parameters and/or weightings and/or thresholds utilized by the models to generate the distinctiveness scores and/or vector representations based at least in part on the data from the training dataset.

At block 810, the process 800 may include determining whether the trained machine learning models indicate improved performance metrics. For example, a testing group may be generated where the outcomes of the distinctiveness determinations are known but not to the trained machine learning models. The trained machine learning models may generate the distinctiveness scores and/or vector representations, which may be compared to the known results to determine whether the results of the trained machine learning model produce a superior result than the results of the machine learning model prior to training.

In examples where the trained machine learning models indicate improved performance metrics, the process 800 may include, at block 812, utilizing the trained machine learning models for generating subsequent results.

In examples where the trained machine learning models do not indicate improved performance metrics, the process 800 may include, at block 814, utilizing the previous iteration of the machine learning models for generating subsequent results.

Figure 9:
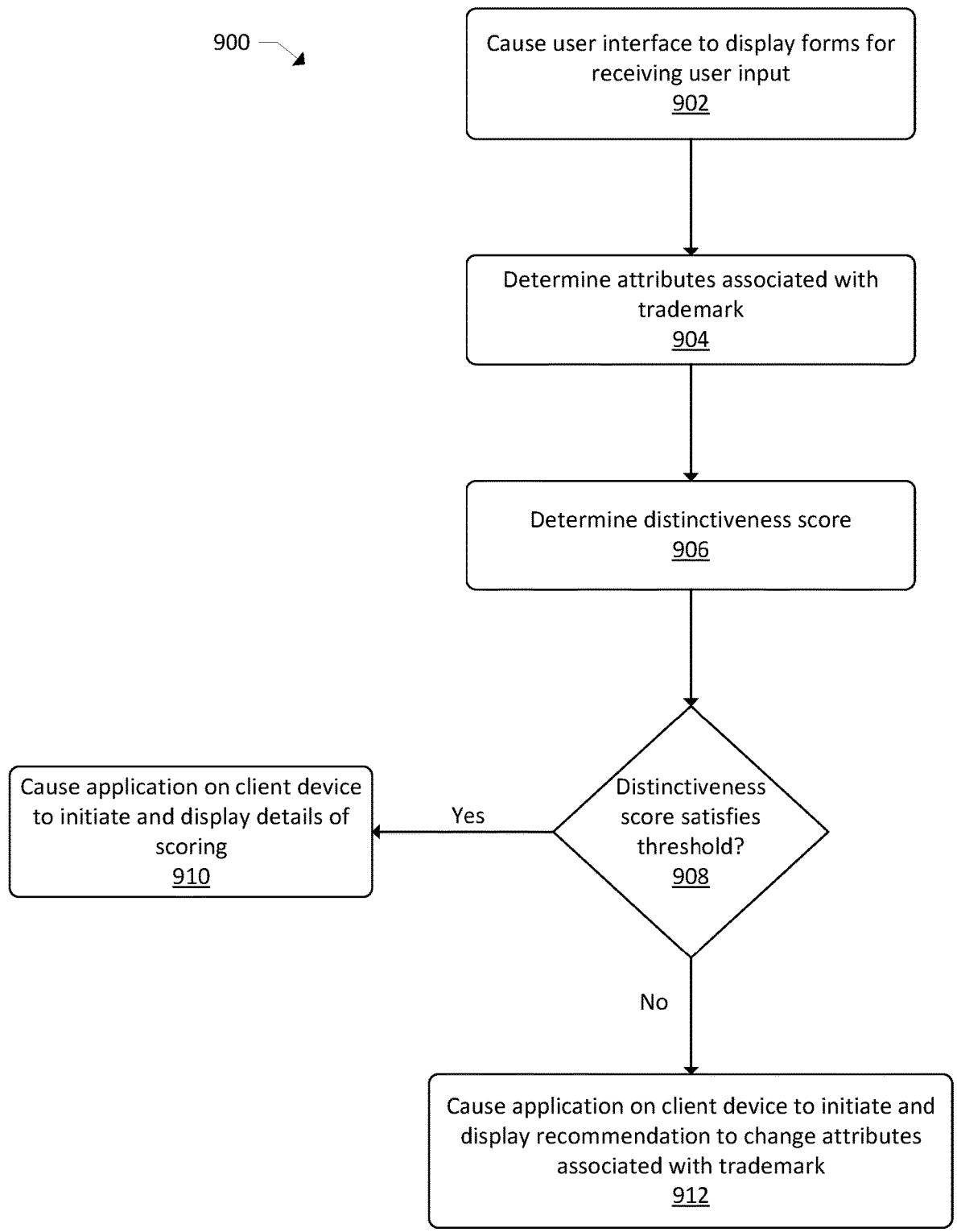
FIG. 9 illustrates a flow diagram of an example process for causing applications residing on devices to automatically display content relevant to dataset distinctiveness modeling.

FIG. 9 illustrates a flow diagram of an example process 900 for causing applications residing on devices to automatically display content relevant to dataset distinctiveness modeling. The order in which the operations or steps are described is not intended to be construed as a limitation, and any number of the described operations may be combined in any order and/or in parallel to implement process 900. The operations described with respect to the process 900 are described as being performed by a client device, and/or a system associated with the document analysis platform. However, it should be understood that some or all of these operations may be performed by some or all of components, devices, and/or systems described herein.

At block 902, the process 900 may include causing a user interface to display forms for receiving user input. For example, the forms may include portions of the user interface configured to receive certain information associated with the trademark in question. For example, the information may include a requested for a distinctiveness determination, an indication of intellectual property assets to be analyzed, trademark owner information, etc.

At block 904, the process 900 may include determining attributes associated with the trademark in question. By way of example, a data acquisition component may acquire data associated with a trademark to be evaluated for distinctiveness. The acquired data may be received from the one or more remote systems that include one or more databases of information. For example, a given database may store data indicating trademark registrations and/or trademark registration applications. This data may include, for a given trademark, the mark at issue, a description of the goods and/or services sold in connection with the mark, and contextual data associated with the trademark, such as a registration number, an application number, a registration date, an application date, a classification of the goods and/or services, a mark type, a register type, a registrant name, a registrant address or other contact identifier, mark use information, disclaimer information, as well as file wrapper information indicating documents that have been filed in association with a trademark application, including whether declarations of continuous use and/or of incontestability have been filed. Additionally, one or more other databases may be queried for information associated with a trademark that is not necessarily present in a trademark registration or trademark application. Such information may include information associated with the registrant/applicant, other trademarks utilized in association with the trademark at issue, evidence of use in commerce, litigation data, data indicating a degree of saturation of similar marks, and/or other factors that may impact trademark distinctiveness. It should be understood that identification of such factors and/or the weighting of such factors as described more fully herein may be determined utilizing machine learning techniques where a machine learning model is trained to identify when certain data negatively or positively impacts trademark distinctiveness and to what degree.

At block 906, the process 900 may include determining a distinctiveness score. For example, once a vector representation of the mark and a vector representation of the description of goods and/or services are generated as described herein, a scoring component of the analysis system may be configured to generate a numerical expression of the distinctiveness of the mark in association with its goods and/or services. The numerical expression may be a score, which may be placed on a scale. For example, a distinctiveness score scale may be set between 1 and 100, and the score for any given mark may be between or include 1 and 100. It should be understood that while this scale is utilized as an example here, it should not be considered as limiting. The numerical expression may be any numerical expression and the scale may be any scale. To determine the score, a distance between the first location of the mark vector representation and the second location of the description vector representation in the vector space may be determined. Shorter distances may indicate less favorable distinctiveness scores, while longer distances may indicate more favorable distinctiveness scores. For example, since the vector representations are representations of the mark and description, respectively, the more similar a mark is to its description of goods and/or services, the more similar the vector representations will be. To the contrary, when a mark differs drastically from its goods and services, the respective vector representations will also differ drastically. The scoring component may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks.

In addition to the above score indicating the distance between the mark vector representation and the description vector representation, the scoring component may also compute scores associated with the context data and/or may weight the distance-based score based at least in part on the context data. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark.

At block 908, the process 900 may include determining whether the distinctiveness score satisfies a threshold score. For example, a given trademark distinctiveness score may indicate that the mark is likely descriptive (or otherwise falls below a distinctiveness threshold) of the goods and/or services sold in connection with the mark. In other examples, the threshold may be set based on a business purpose associated with the analysis. For example, when the distinctiveness score is to be utilized to generate a valuation for the trademark, the threshold may be set at a score indicating a minimum distinctiveness required to value the trademark.

In examples where the distinctiveness score satisfies the threshold score, the process 900 may include, at block 910, causing an application on a client device to initiate and display details of the distinctiveness scoring. For example, an application residing on the client device may be caused to surface in a foreground of the device and a user interface associated with the application may be displayed. The user interface may display the distinctiveness score, factors that lead to the distinctiveness score, the vector representations, etc.

In examples where the distinctiveness score does not satisfy the threshold score, the process 900 may include, at block 912, causing the application on the client device to initiate and display a recommendation to change attributes associated with the trademark and/or the description of goods and/or services. Causing the application on the client device to initiate may be performed in the same or a similar manner as described with respect to block 910, above.

Figure 10:
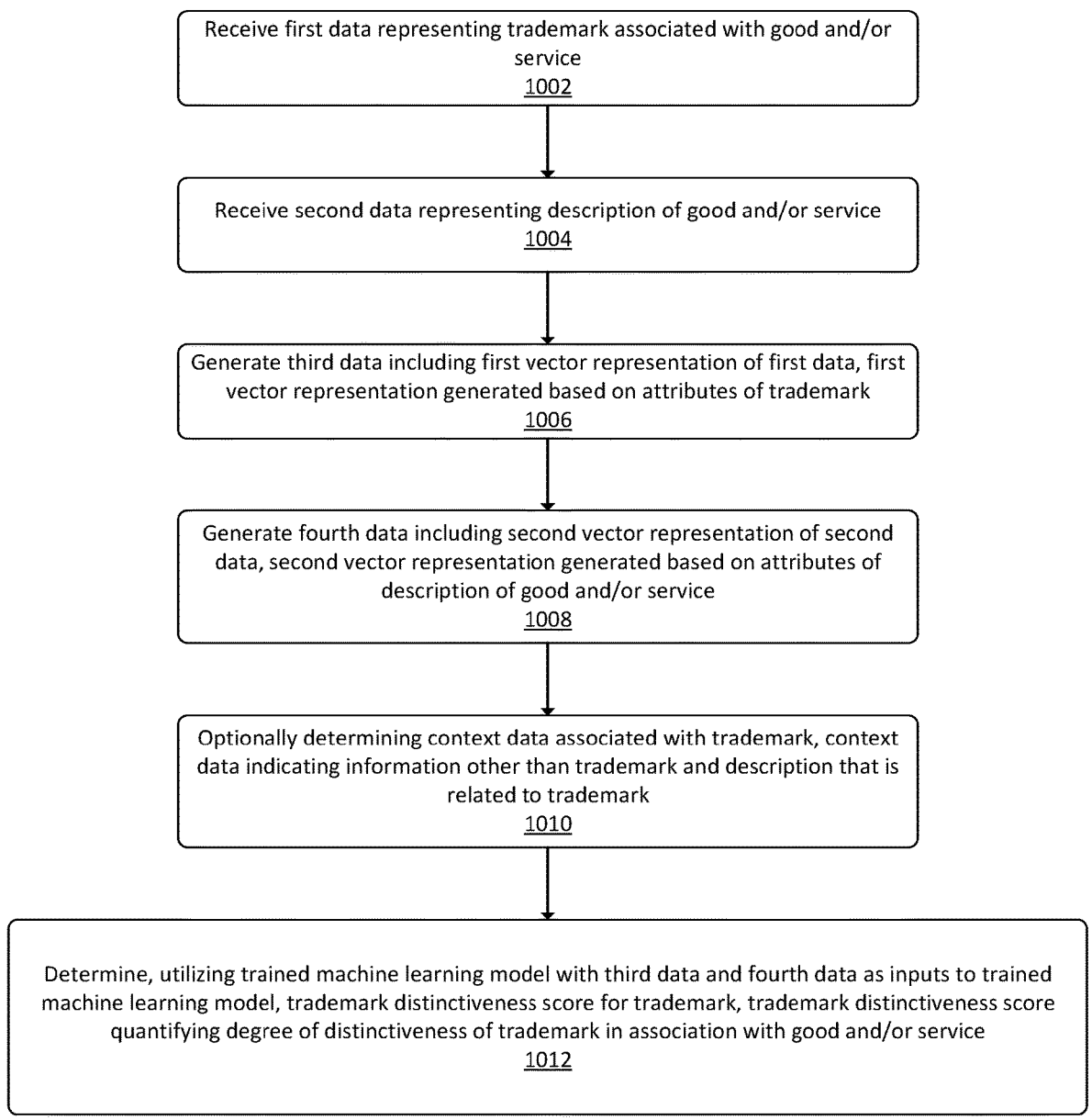
FIG. 10 illustrates a flow diagram of an example process for dataset distinctiveness modeling.

FIG. 10 illustrates a flow diagram of an example process 1000 for dataset distinctiveness modeling. The order in which the operations or steps are described is not intended to be construed as a limitation, and any number of the described operations may be combined in any order and/or in parallel to implement process 1000. The operations described with respect to the process 1000 are described as being performed by a client device, and/or a system associated with the document analysis platform. However, it should be understood that some or all of these operations may be performed by some or all of components, devices, and/or systems described herein.

At block 1002, the process 1000 may include receiving first data representing a trademark associated with at least one of a good or service. To do so, a data acquisition component of an analysis system may acquire data associated with a trademark to be evaluated for distinctiveness. The acquired data may be received from one or more remote systems that include one or more databases of information. For example, a given database may store data indicating trademark registrations and/or trademark registration applications. This data may include, for a given trademark, the mark at issue, a description of the goods and/or services sold in connection with the mark, and contextual data associated with the trademark, such as a registration number, an application number, a registration date, an application date, a classification of the goods and/or services, a mark type, a register type, a registrant name, a registrant address or other contact identifier, mark use information, disclaimer information, as well as file wrapper information indicating documents that have been filed in association with a trademark application, including whether declarations of continuous use and/or of incontestability have been filed.

At block 1004, the process 1000 may include receiving second data representing a description of the at least one of the good or the service. Receipt of the second data may be performed in the same or a similar manner as receipt of the first data described with respect to block 1002.

At block 1006, the process 1000 may include generating third data including a first vector representation of the first data, the first vector representation generated based on attributes of the trademark. For example, a vector component of the analysis system may be configured to receive the acquired data from the data acquisition component and to generate one or more vector representations of the data. For example, the vector component may first parse the acquired data to determine which portion of the data represents the trademark at issue. To do so, field identifiers may be generated and utilized to identify which portions of the data represent the various information described above. Once the vector component determines which portion of the data represents the trademark at issue, the vector component may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, an analysis component of the system may generate metadata to associate with the trademark that defines the various components of the trademark in a way that the vector component can utilize to generate a vector representation of the trademark. For example, the analysis component may take the image data and may generate text data indicating attributes of the image at issue, such as identification of objects depicted in the image and descriptions of those objects. To do so, computer vision techniques may be utilized as described in more detail below. Additionally, the analysis component may utilize the color data to generate a textual representation of the colors at issue. For example, when the mark includes the colors blue, red, and yellow, the analysis component may identify those colors and generate metadata indicating a textual representation of those colors. The symbol data may be utilized to generate metadata indicating that there is at least one symbol in the mark, identifying the symbol, and/or generate a textual representation of the symbol. For example, if the mark includes a "peace sign," the metadata may include an identifier of the peace sign and/or may include a textual representation of the symbol, specifically "peace sign." The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning collectively than the element individually. For example, a mark with an image of a baby goat and a stone, when combined, may mean "you rock," even though those terms are not present in the mark. Some or all of this metadata may be formatted such that the vector component may utilize the metadata to generate a vector representation of the mark.

To generate a vector representation of the mark, the vector component may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation of the mark in the vector space.

At block 1008, the process 1000 may include generating fourth data including a second vector representation of the second data, the second vector representation generated based on attributes of the description of the at least one of the good or the service. To do so, the data representing the goods and/or services may be parsed from the data received from the data acquisition component. This data may include the description of goods and/or services from a trademark registration and/or trademark registration application, and/or the data may be determined from marketing data, product descriptions available to consumers, etc. The same or similar techniques as used to generate the vector representation of the mark may be utilized to generate the vector representation of the description of goods and/or services. As such the description vector representation may be generated and may be associated with a second location in the vector space.

At block 1010, the process 1000 may include optionally determining context data associated with the trademark, the context data indicating information other than the trademark and description that is related to the trademark. For example, a context component of the analysis system may be configured to generate context data from the acquired data and to utilize the context data to inform generation of the vector representations. For example, the context component may be utilized to determine that a portion of a registered mark has been disclaimed and thus should not be considered in and of itself as a portion of the mark at issue. Other context data indicating attributes of the mark and/or the goods or services may be utilized to more accurately determine what the mark and/or goods or services are. This context data may be utilized by the vector component to generate the vector representations as described herein.

At block 1012, the process 1000 may include determining, utilizing a trained machine learning model with the third data and the fourth data as inputs to the trained machine learning model, a trademark distinctiveness score for the trademark, the trademark distinctiveness score quantifying a degree of distinctiveness of the trademark in association with the at least one of the good or the service. For example, once a vector representation of the mark and a vector representation of the description of goods and/or services are generated, a scoring component of the analysis system may be configured to generate a numerical expression of the distinctiveness of the mark in association with its goods and/or services. The numerical expression may be a score, which may be placed on a scale. For example, a distinctiveness score scale may be set between 1 and 100, and the score for any given mark may be between or include 1 and 100. It should be understood that while this scale is utilized as an example here, it should not be considered as limiting. The numerical expression may be any numerical expression and the scale may be any scale. To determine the score, a distance between the first location of the mark vector representation and the second location of the description vector representation in the vector space may be determined. Shorter distances may indicate less favorable distinctiveness scores, while longer distances may indicate more favorable distinctiveness scores. For example, since the vector representations are representations of the mark and description, respectively, the more similar a mark is to its description of goods and/or services, the more similar the vector representations will be. To the contrary, when a mark differs drastically from its goods and services, the respective vector representations will also differ drastically. The scoring component may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks.

In addition to the above score indicating the distance between the mark vector representation and the description vector representation, the scoring component may also compute scores associated with the context data and/or may weight the distance-based score based at least in part on the context data. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark.

It should be understood that when distances between vector representations are described herein and/or when comparisons are described here with respect to vector representations, one or more techniques may be utilized to make these determinations. Those techniques may include, for example, determining cosine distances, determining Euclidean distances or other Euclidean measurements, determining Manhattan distances, and/or determining Minowski distances.

Additionally, or alternatively, the process 1000 may include the context data including at least one of (a) a first indication that the trademark is associated with a first declaration that the trademark has been used in commerce continuously for at least a first period of time, (b) a second indication that the trademark is associated with a second declaration that an owner of a registration for the trademark has claimed incontestable rights in the trademark, or (c) a third indication that a disclaimer has been associated with the trademark. The process 1000 may also include weighting the trademark distinctiveness score based on the context data.

Additionally, or alternatively, the process 1000 may include determining, from the first data, a text portion of the trademark and generating, utilizing text data representing the text portion of the trademark, metadata associated with the text data, the metadata indicating syllables of the text portion of the trademark. The process 1000 may also include determining that the syllables of the text portion correspond to a word or phrase in a reference database of words and phrases. In these examples, generating the third data including the first vector representation may be based on the syllables corresponding to the word or the phrase.

Additionally, or alternatively, the process 1000 may include determining, from the first data, a text portion of the trademark and generating, utilizing text data representing the text portion of the trademark, metadata associated with the text data, the metadata indicating syllables of the text portion of the trademark. The process 1000 may also include determining that the syllables of the text portion differ from a word or phrase in a reference database of other trademarks. In these examples, the trademark distinctiveness score may be based on the syllables of the text portion differing from the word or the phrase.

Figure 11:
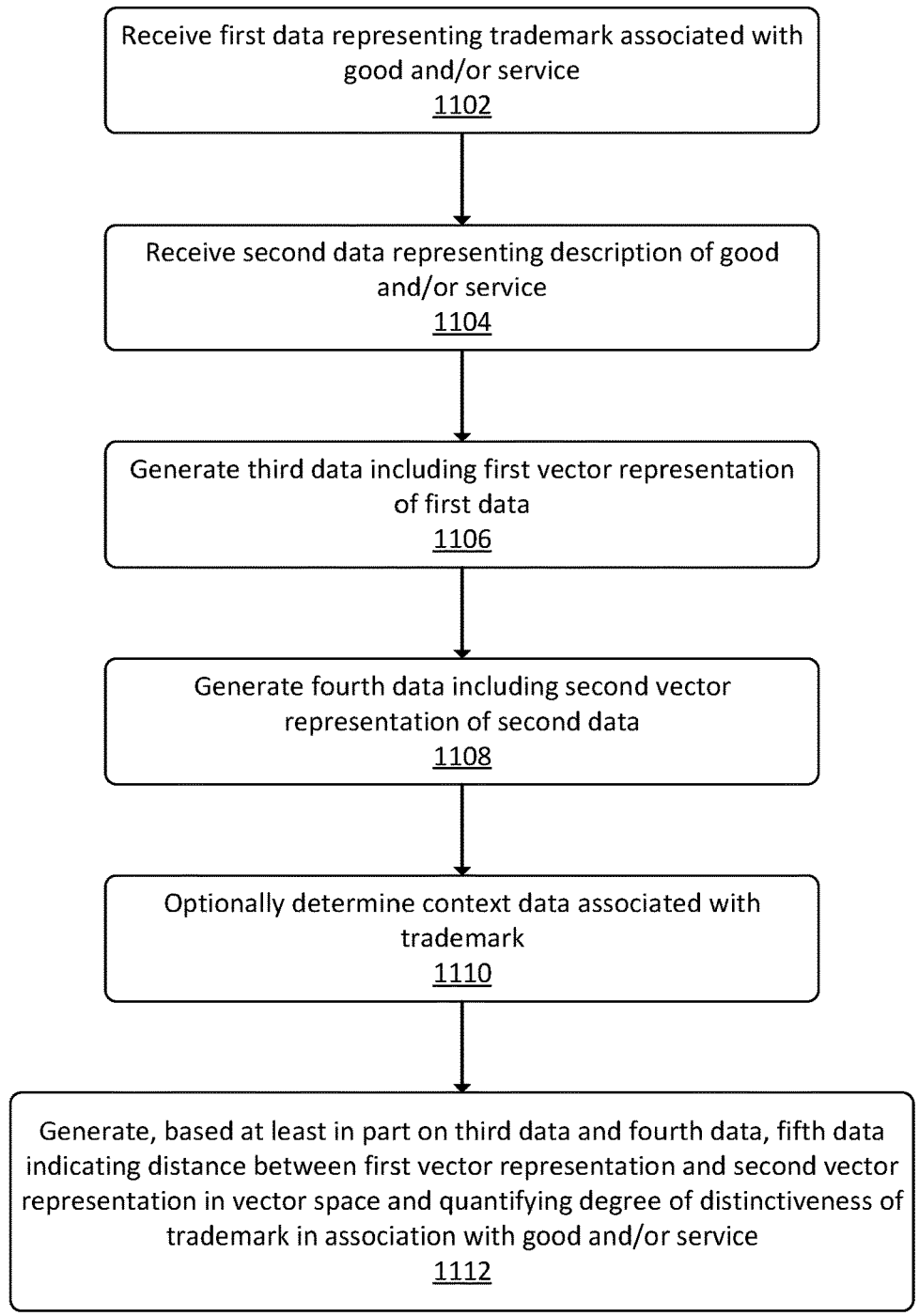
FIG. 11 illustrates a flow diagram of another example process for dataset distinctiveness modeling.

FIG. 11 illustrates a flow diagram of another example process 1100 for dataset distinctiveness modeling. The order in which the operations or steps are described is not intended to be construed as a limitation, and any number of the described operations may be combined in any order and/or in parallel to implement process 1100. The operations described with respect to the process 1100 are described as being performed by a client device, and/or a system associated with the document analysis platform. However, it should be understood that some or all of these operations may be performed by some or all of components, devices, and/or systems described herein.

At block 1102, the process 1100 may include receiving first data representing a trademark associated with at least one of a good or service. To do so, a data acquisition component of an analysis system may acquire data associated with a trademark to be evaluated for distinctiveness. The acquired data may be received from one or more remote systems that include one or more databases of information. For example, a given database may store data indicating trademark registrations and/or trademark registration applications. This data may include, for a given trademark, the mark at issue, a description of the goods and/or services sold in connection with the mark, and contextual data associated with the trademark, such as a registration number, an application number, a registration date, an application date, a classification of the goods and/or services, a mark type, a register type, a registrant name, a registrant address or other contact identifier, mark use information, disclaimer information, as well as file wrapper information indicating documents that have been filed in association with a trademark application, including whether declarations of continuous use and/or of incontestability have been filed.

At block 1104, the process 1100 may include receiving second data representing a description of the at least one of the good or the service. Receipt of the second data may be performed in the same or a similar manner as receipt of the first data described with respect to block 1102.

At block 1106, the process 1100 may include generating third data including a first vector representation of the first data. For example, a vector component of the analysis system may be configured to receive the acquired data from the data acquisition component and to generate one or more vector representations of the data. For example, the vector component may first parse the acquired data to determine which portion of the data represents the trademark at issue. To do so, field identifiers may be generated and utilized to identify which portions of the data represent the various information described above. Once the vector component determines which portion of the data represents the trademark at issue, the vector component may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, an analysis component of the system may generate metadata to associate with the trademark that defines the various components of the trademark in a way that the vector component can utilize to generate a vector representation of the trademark. For example, the analysis component may take the image data and may generate text data indicating attributes of the image at issue, such as identification of objects depicted in the image and descriptions of those objects. To do so, computer vision techniques may be utilized as described in more detail below. Additionally, the analysis component may utilize the color data to generate a textual representation of the colors at issue. For example, when the mark includes the colors blue, red, and yellow, the analysis component may identify those colors and generate metadata indicating a textual representation of those colors. The symbol data may be utilized to generate metadata indicating that there is at least one symbol in the mark, identifying the symbol, and/or generate a textual representation of the symbol. For example, if the mark includes a "peace sign," the metadata may include an identifier of the peace sign and/or may include a textual representation of the symbol, specifically "peace sign." The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning collectively than the element individually. For example, a mark with an image of a baby goat and a stone, when combined, may mean "you rock," even though those terms are not present in the mark. Some or all of this metadata may be formatted such that the vector component may utilize the metadata to generate a vector representation of the mark.

To generate a vector representation of the mark, the vector component may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation of the mark in the vector space.

At block 1108, the process 1100 may include generating fourth data including a second vector representation of the second data. To do so, the data representing the goods and/or services may be parsed from the data received from the data acquisition component. This data may include the description of goods and/or services from a trademark registration and/or trademark registration application, and/or the data may be determined from marketing data, product descriptions available to consumers, etc. The same or similar techniques as used to generate the vector representation of the mark may be utilized to generate the vector representation of the description of goods and/or services. As such the description vector representation may be generated and may be associated with a second location in the vector space.

At block 1110, the process 1100 may include optionally determining context data associated with the trademark. For example, a context component of the analysis system may be configured to generate context data from the acquired data and to utilize the context data to inform generation of the vector representations. For example, the context component may be utilized to determine that a portion of a registered mark has been disclaimed and thus should not be considered in and of itself as a portion of the mark at issue. Other context data indicating attributes of the mark and/or the goods or services may be utilized to more accurately determine what the mark and/or goods or services are. This context data may be utilized by the vector component to generate the vector representations as described herein.

At block 1112, the process 1100 may include generating, based at least in part on the third data and the fourth data, fifth data indicating a distance between the first vector representation and the second vector representation in a vector space and quantifying a degree of distinctiveness of the trademark in association with the at least one of the good or the service. For example, once a vector representation of the mark and a vector representation of the description of goods and/or services are generated, a scoring component of the analysis system may be configured to generate a numerical expression of the distinctiveness of the mark in association with its goods and/or services. The numerical expression may be a score, which may be placed on a scale. For example, a distinctiveness score scale may be set between 1 and 100, and the score for any given mark may be between or include 1 and 100. It should be understood that while this scale is utilized as an example here, it should not be considered as limiting. The numerical expression may be any numerical expression and the scale may be any scale. To determine the score, a distance between the first location of the mark vector representation and the second location of the description vector representation in the vector space may be determined. Shorter distances may indicate less favorable distinctiveness scores, while longer distances may indicate more favorable distinctiveness scores. For example, since the vector representations are representations of the mark and description, respectively, the more similar a mark is to its description of goods and/or services, the more similar the vector representations will be. To the contrary, when a mark differs drastically from its goods and services, the respective vector representations will also differ drastically. The scoring component may include modeling techniques, and such models may be trained to determine what score should be assigned to a given distance between vector representations. For example, training datasets indicating when marks have been determined to be generic, descriptive, suggestive, or arbitrary and/or fanciful may be utilized to determine the relative distances associated with those mark vector representations and their related description vector representations. Additionally, scoring thresholds may be established (including dynamically), to differentiate between generic, distinctive, suggestive, and arbitrary and/or fanciful marks.

In addition to the above score indicating the distance between the mark vector representation and the description vector representation, the scoring component may also compute scores associated with the context data and/or may weight the distance-based score based at least in part on the context data. For example, details associated with the trademark registration and/or application may be utilized to generate a score, details about the registrant itself may be utilized to generate a score, details about other similar marks may be utilized to generate a score, etc. These scores may be combined or otherwise may influence the distance-based score described herein to generate a final trademark distinctiveness score for a given mark.

Additionally, or alternatively, the process 1100 may include the context data including at least one of (a) a first indication that the trademark is associated with a first declaration that the trademark has been in use continuously for at least a first period of time, (b) a second indication that the trademark is associated with a second declaration that an owner of a registration for the trademark has claimed incontestable rights in the trademark, or (c) a third indication that a disclaimer has been associated with the trademark. The process 1100 may also include weighting the fifth data based at least in part on the context data.

Additionally, or alternatively, the process 1100 may include generating, utilizing text data representing a text portion of the trademark, metadata indicating syllables of the text portion of the trademark. The process 1100 may also include determining that the syllables of the text portion correspond to a word in a reference database of words. In these examples, generating the third data including the first vector representation may be based at least in part on the syllables corresponding to the word.

Additionally, or alternatively, the process 1100 may include generating, utilizing text data representing a text portion of the trademark, metadata indicating syllables of the text portion of the trademark. The process 1100 may also include determining that the syllables of the text portion do not correspond to from a word in a reference database of other trademarks. In these examples, the fifth data may be based at least in part on the syllables of the text portion not corresponding to the word.

Additionally, or alternatively, the process 1100 may include generating a machine learning model configured to determine a correlation between trademarks and related descriptions of goods and services. The process 1100 may also include generating a training dataset based at least in part on feedback data associated with prior correlations between the trademarks and the related descriptions of goods and services. The process 1100 may also include training the machine learning model utilizing the training dataset such that a trained machine learning model is generated. In these examples, generating the fifth data may be performing utilizing the trained machine learning model.

Additionally, or alternatively, the process 1100 may include determining that the distance satisfies a threshold distance indicating that the trademark is similar to the description of the at least one of the good or the service. The process 1100 may also include generating, based at least in part on the distance satisfying the threshold distance, a recommendation to change the description of the at least one of the good or the service, the recommendation including an alternative description of the at least one of the good or the service, the alternative description associated with a third vector representation having a greater distance from the first vector representation than the distance.

Additionally, or alternatively, the process 1100 may include determining, from text data associated with a text portion of the trademark, that the text portion corresponds to an acronym listed in a database of acronyms. The process 1100 may also include determining, utilizing the database, a phrase that corresponds to the acronym. In these examples, generating the third data including the first vector representation may be based at least in part on the phrase that corresponds to the acronym.

Additionally, or alternatively, the process 1100 may include querying a set of databases to determine a first language associated with the trademark, individual ones of the set of databases including words in a given language. The process 1100 may also include determining that the description of the at least one of the good or the service is in a second language that differs from the first language. The process 1100 may also include translating the trademark from the first language to the second language. In these examples, generating the third data including the first vector representation may be based at least in part on a translated version of the trademark to the second language.

Figure 12:
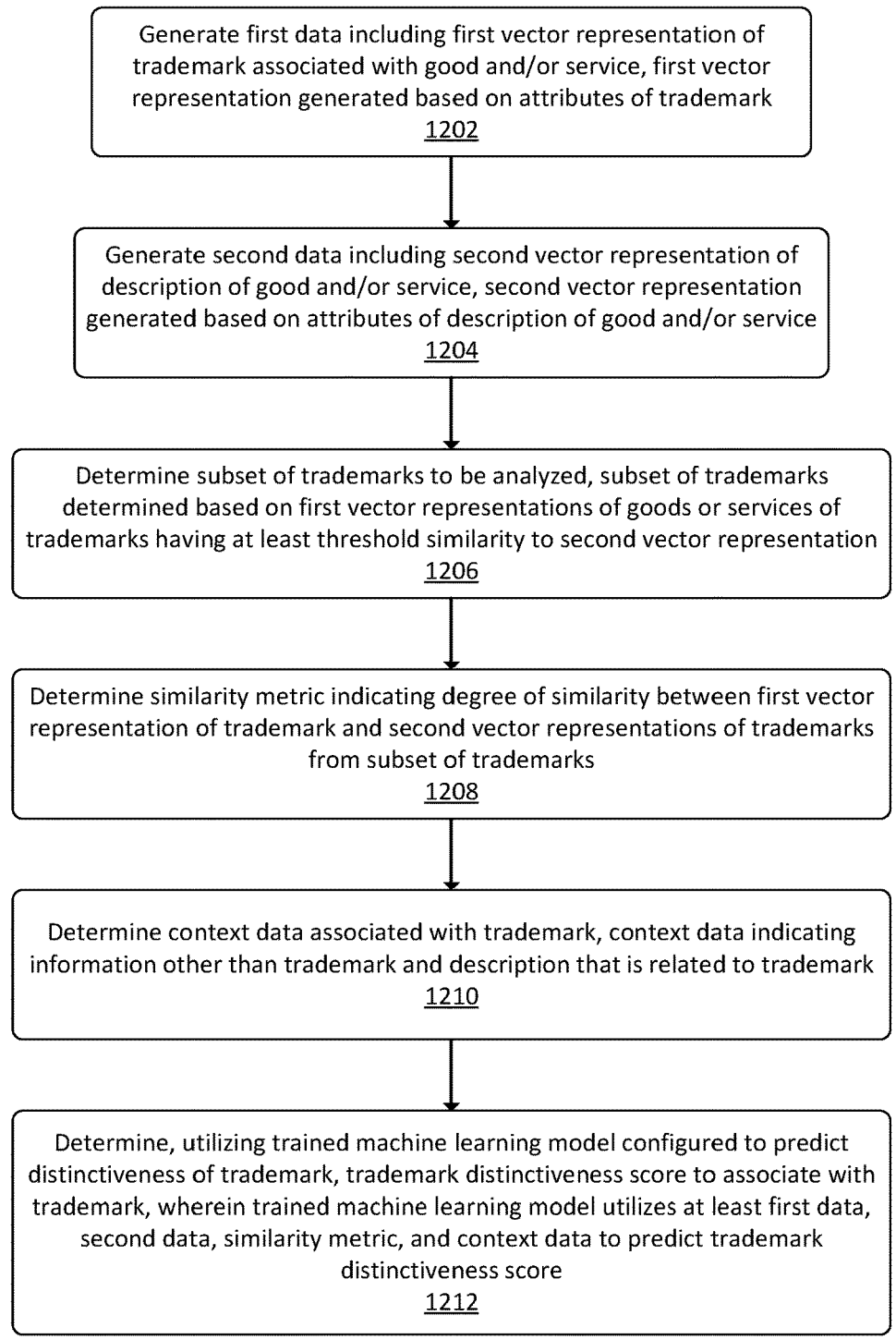
FIG. 12 illustrates a flow diagram of an example process for trademark distinctiveness scoring across marks.

FIG. 12 illustrates a flow diagram of an example process 1200 for trademark distinctiveness scoring across marks. The order in which the operations or steps are described is not intended to be construed as a limitation, and any number of the described operations may be combined in any order and/or in parallel to implement process 1200. The operations described with respect to the process 1200 are described as being performed by a client device, and/or a system associated with the document analysis platform. However, it should be understood that some or all of these operations may be performed by some or all of components, devices, and/or systems described herein.

At block 1202, the process 1200 may include generating first data including a first vector representation of a trademark associated with at least one of a good or service, the first vector representation generated based on attributes of the trademark. For example, a vector component of the analysis system may be configured to receive the acquired data from the data acquisition component and to generate one or more vector representations of the data. For example, the vector component may first parse the acquired data to determine which portion of the data represents the trademark at issue. To do so, field identifiers may be generated and utilized to identify which portions of the data represent the various information described above. Once the vector component determines which portion of the data represents the trademark at issue, the vector component may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, an analysis component of the system may generate metadata to associate with the trademark that defines the various components of the trademark in a way that the vector component can utilize to generate a vector representation of the trademark. For example, the analysis component may take the image data and may generate text data indicating attributes of the image at issue, such as identification of objects depicted in the image and descriptions of those objects. To do so, computer vision techniques may be utilized as described in more detail below. Additionally, the analysis component may utilize the color data to generate a textual representation of the colors at issue. For example, when the mark includes the colors blue, red, and yellow, the analysis component may identify those colors and generate metadata indicating a textual representation of those colors. The symbol data may be utilized to generate metadata indicating that there is at least one symbol in the mark, identifying the symbol, and/or generate a textual representation of the symbol. For example, if the mark includes a "peace sign," the metadata may include an identifier of the peace sign and/or may include a textual representation of the symbol, specifically "peace sign." The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning collectively than the element individually. For example, a mark with an image of a baby goat and a stone, when combined, may mean "you rock," even though those terms are not present in the mark. Some or all of this metadata may be formatted such that the vector component may utilize the metadata to generate a vector representation of the mark.

To generate a vector representation of the mark, the vector component may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation of the mark in the vector space.

At block 1204, the process 1200 may include generating second data including a second vector representation of a description of the at least one of the good or service, the second vector representation generated based on attributes of the description of the at least one of the good or the service. To do so, the data representing the goods and/or services may be parsed from the data received from the data acquisition component. This data may include the description of goods and/or services from a trademark registration and/or trademark registration application, and/or the data may be determined from marketing data, product descriptions available to consumers, etc. The same or similar techniques as used to generate the vector representation of the mark may be utilized to generate the vector representation of the description of goods and/or services. As such the description vector representation may be generated and may be associated with a second location in the vector space.

At block 1206, the process 1200 may include determining a subset of trademarks to be analyzed, the subset of trademarks determined based on first vector representations of the goods or services of the trademarks having at least a threshold similarity to the second vector representation. For example, a database of trademarks may be maintained and/or accessed and some or all of the goods and/or services associated with these trademarks may be utilized to generate vector representations. These vector representations of the goods and/or services of other trademarks may be compared to the vector representation of the goods and/or services of the trademark at issue. A subset of these other trademarks may be selected based at least on a degree of similarity as between the vector representation of the goods and/or services of the mark at issue and the reference vector representations of the goods and/or services of the other marks. For example, the vector representations may be plotted in a vector space and a distance between the vector of the goods and/or services of the mark at issue and the other vectors may be determined. When distances between vectors are shorter, that may indicate more similarity as between goods and/or services. When distances are longer, that may indicate less similarity as between goods and/or services. In other examples, vector aggregation techniques may be utilized as to the reference vectors to determine a centroid and/or common vector for groups of marks. Distances between the vector at issue and the group centroids may be utilized to determine the subset of marks to analyze further.

At block 1208, the process 1200 may include determining a similarity metric indicating a degree of similarity between the first vector representation of the trademark and second vector representations of the trademarks from the subset of the trademarks. Once a subset of trademarks are identified as described above, or in some examples when a corpus of trademarks is identified, comparison of the trademark vector at issue may be performed with vector representations of the trademarks in the subset of trademarks. As described herein, a similarity metric may be generated that indicates a distance between the mark at issue and the other marks in the subset of marks. When at least one of the other marks is close in distance to the mark at issue, that may indicate that the mark's distinctiveness is less than if all vectors of the subset of the marks are a greater distance from the mark vector at issue. In some examples, instead of performing a comparison with only the subset of trademarks, the analysis of the subset of trademarks may be weighted more than other marks not in the subset of trademarks.

At block 1210, the process 1200 may include determining context data associated with the trademark, the context data indicating information other than the trademark and description that is related to the trademark. For example, a context component of the analysis system may be configured to generate context data from the acquired data and to utilize the context data to inform generation of the vector representations. For example, the context component may be utilized to determine that a portion of a registered mark has been disclaimed and thus should not be considered in and of itself as a portion of the mark at issue. Other context data indicating attributes of the mark and/or the goods or services may be utilized to more accurately determine what the mark and/or goods or services are. This context data may be utilized by the vector component to generate the vector representations as described herein.

At block 1212, the process 1200 may include determining, utilizing a trained machine learning model configured to predict distinctiveness of the trademark, a trademark distinctiveness score to associate with the trademark, wherein the trained machine learning model utilizes at least the first data, the second data, the similarity metric, and the context data to predict the trademark distinctiveness score. For example, utilizing some or all of the vector of the mark at issue, the vector of the goods and/or services, the comparison of the mark to the goods and/or services, the context data, the similarity metric with other marks, the analysis of the subset of the marks, etc., a trained machine learning model may be generated and utilized to determine distinctiveness scores. For example, as described in more detail herein, a machine learning model may be trained utilizing a training dataset of some or all of the information described herein. The machine learning model may also be trained based at least in part on outcome data that provides a ground truth for trademark distinctiveness. This ground truth data may include litigation-related data such as data indicating that a reference trademark is associated with a principal register of trademarks or a supplemental register of trademarks, data indicating whether a disclaimer is associated with the reference trademark, data indicating whether an affidavit of incontestability is associated with the reference trademark, and/or data indicating whether an affidavit of continuous use for a predetermined time is associated with the reference trademark. The training data may also include data indicating distinctiveness findings associated with litigation of a reference trademark, data indicating findings of famousness associated with the litigation, and/or data indicating outcomes of cancellation proceedings associated with the reference trademark. A trained machine learning model may be generated and may utilize some or all of the data described herein to generate a trademark distinctiveness score for a given trademark. This distinctiveness score may be utilized for one or more purposes, including for litigation purposes, for brand selection purposes, for brand valuation purposes, for loan acquisition.

Additionally, or alternatively, the process 1200 may include generating a machine learning model configured to predict trademark distinctiveness. The process 1200 may also include generating a training dataset including at least: first reference vector representations of reference trademarks; second reference vector representations of reference goods or services associated with the reference trademarks; reference similarity metrics indicating similarity between individual ones of the first reference vector representations; reference context data associated with the reference trademarks; and third data indicating known distinctiveness outcomes associated with the reference trademarks. The process 1200 may also include training the machine learning model utilizing the training dataset such that the trained machine learning model is generated.

Additionally, or alternatively, the process 1200 may include receiving third data indicating that another trademark has been included in a dataset from which the first data was received. The process 1200 may also include determining to retrain the trained machine learning model based on receiving the third data. The process 1200 may also include retraining the trained machine learning model utilizing at least the third data.

Additionally, or alternatively, the process 1200 may include generating an aggregated vector representation of the second vector representations, the aggregated vector representation indicating a centroid of the second vector representations. In these examples, determining the similarity metric may be performed utilizing the first vector representation and the aggregated vector representation.

Figure 13:
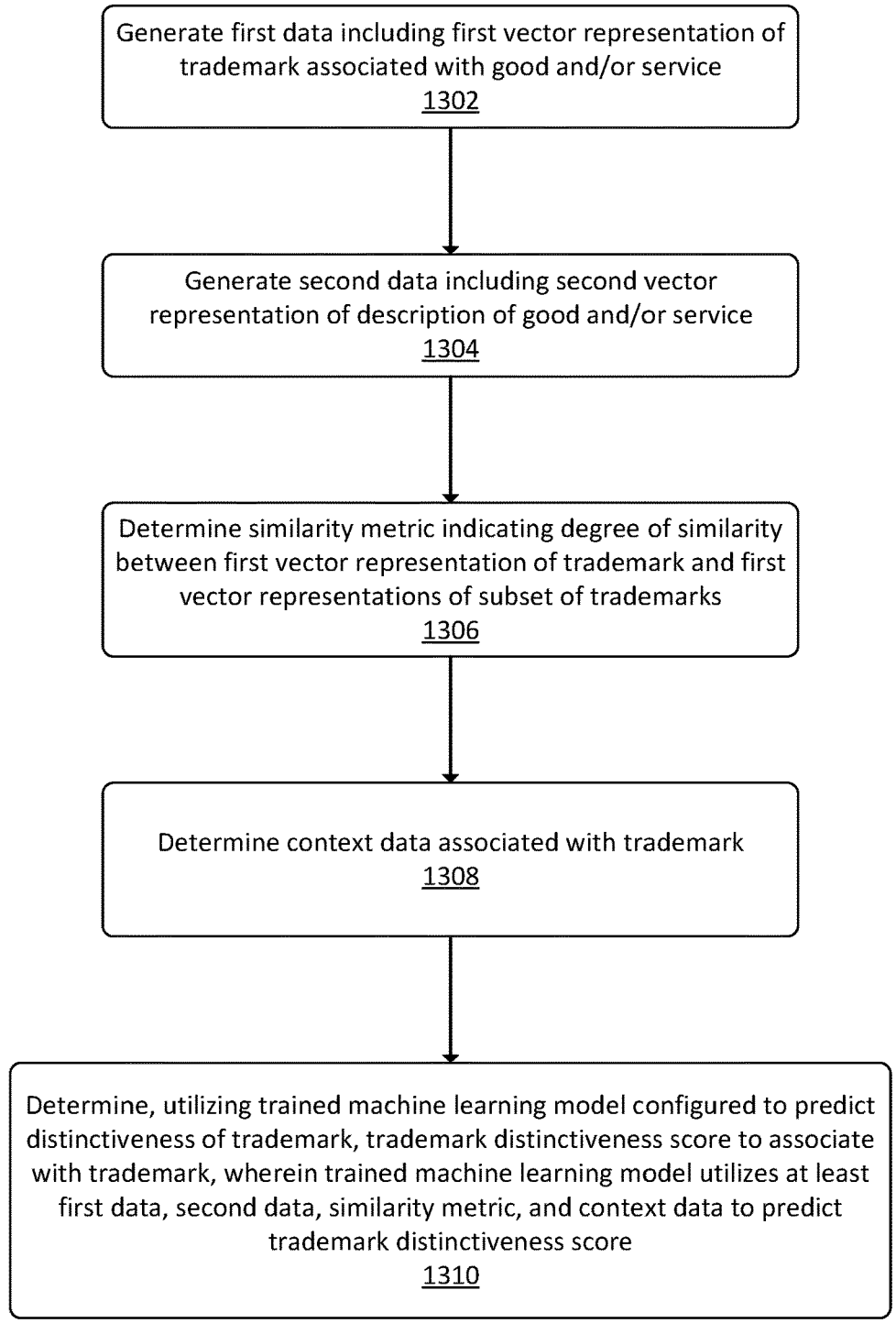
FIG. 13 illustrates a flow diagram of another example process for trademark distinctiveness scoring across marks.

FIG. 13 illustrates a flow diagram of another example process 1300 for trademark distinctiveness scoring across marks. The order in which the operations or steps are described is not intended to be construed as a limitation, and any number of the described operations may be combined in any order and/or in parallel to implement process 1300. The operations described with respect to the process 1300 are described as being performed by a client device, and/or a system associated with the document analysis platform. However, it should be understood that some or all of these operations may be performed by some or all of components, devices, and/or systems described herein.

At block 1302, the process 1300 may include generating first data including a first vector representation of a trademark associated with at least one of a good or service. For example, a vector component of the analysis system may be configured to receive the acquired data from the data acquisition component and to generate one or more vector representations of the data. For example, the vector component may first parse the acquired data to determine which portion of the data represents the trademark at issue. To do so, field identifiers may be generated and utilized to identify which portions of the data represent the various information described above. Once the vector component determines which portion of the data represents the trademark at issue, the vector component may initiate a process of identifying features of the trademark. In some examples, the mark itself is simply a word mark or otherwise includes text data but nothing else. In other examples, the mark may include more than text data, such as image data indicating an image portion of the mark, color data indicating the mark is associated with one or more colors, symbol data indicating a portion of the mark is a symbol, sound data indicating the mark includes a sound element, and/or meaning data indicating that at least a portion of the mark includes a meaning that is not strictly present in the mark itself.

Given the disparate nature of these data types, an analysis component of the system may generate metadata to associate with the trademark that defines the various components of the trademark in a way that the vector component can utilize to generate a vector representation of the trademark. For example, the analysis component may take the image data and may generate text data indicating attributes of the image at issue, such as identification of objects depicted in the image and descriptions of those objects. To do so, computer vision techniques may be utilized as described in more detail below. Additionally, the analysis component may utilize the color data to generate a textual representation of the colors at issue. For example, when the mark includes the colors blue, red, and yellow, the analysis component may identify those colors and generate metadata indicating a textual representation of those colors. The symbol data may be utilized to generate metadata indicating that there is at least one symbol in the mark, identifying the symbol, and/or generate a textual representation of the symbol. For example, if the mark includes a "peace sign," the metadata may include an identifier of the peace sign and/or may include a textual representation of the symbol, specifically "peace sign." The sound data may be utilized to generate metadata indicating lyrics if any in the sound, given instrument noises, and/or other noises included in the sound. For example, if the sound data is of a spring decompressing to make a "boing" sound, metadata may be generated indicating that the sound data includes this noise. The meaning data may be utilized to generate metadata indicating that while a given mark does not include certain words, phrases, or otherwise elements, the mark includes something that means those words, phrases, or otherwise. An example of this would be when the mark includes an acronym, or when a combination of the elements of the mark indicate a different meaning collectively than the element individually. For example, a mark with an image of a baby goat and a stone, when combined, may mean "you rock," even though those terms are not present in the mark. Some or all of this metadata may be formatted such that the vector component may utilize the metadata to generate a vector representation of the mark.

To generate a vector representation of the mark, the vector component may be configured to utilize one or more data analysis techniques and modeling techniques to convert the various data forms associated with the mark into a vector representation associated with a vector space. For example, the vector representation may include a two or three-dimensional indication of a location of the vector representation in the vector space. The techniques to generate the vector representation may include, but are not limited to, machine learning techniques, natural language processing and/or automatic speech recognition, semantic modeling, reinforcement learning, dense vector techniques such as word2vec, computer vision techniques, search-based APIs, etc. In each of these scenarios, the presence or absence of certain elements in the mark may indicate the location of the vector representation of the mark in the vector space.

At block 1304, the process 1300 may include generating second data including a second vector representation of a description of the at least one of the good or service. To do so, the data representing the goods and/or services may be parsed from the data received from the data acquisition component. This data may include the description of goods and/or services from a trademark registration and/or trademark registration application, and/or the data may be determined from marketing data, product descriptions available to consumers, etc. The same or similar techniques as used to generate the vector representation of the mark may be utilized to generate the vector representation of the description of goods and/or services. As such the description vector representation may be generated and may be associated with a second location in the vector space.

At block 1306, the process 1300 may include determining a similarity metric indicating a degree of similarity between the first vector representation of the trademark and first vector representations of a subset of trademarks. Once a subset of trademarks are identified as described above, or in some examples when a corpus of trademarks is identified, comparison of the trademark vector at issue may be performed with vector representations of the trademarks in the subset of trademarks. As described herein, a similarity metric may be generated that indicates a distance between the mark at issue and the other marks in the subset of marks. When at least one of the other marks is close in distance to the mark at issue, that may indicate that the mark's distinctiveness is less than if all vectors of the subset of the marks are a greater distance from the mark vector at issue. In some examples, instead of performing a comparison with only the subset of trademarks, the analysis of the subset of trademarks may be weighted more than other marks not in the subset of trademarks.

At block 1308, the process 1300 may include determining context data associated with the trademark. For example, a context component of the analysis system may be configured to generate context data from the acquired data and to utilize the context data to inform generation of the vector representations. For example, the context component may be utilized to determine that a portion of a registered mark has been disclaimed and thus should not be considered in and of itself as a portion of the mark at issue. Other context data indicating attributes of the mark and/or the goods or services may be utilized to more accurately determine what the mark and/or goods or services are. This context data may be utilized by the vector component to generate the vector representations as described herein.

At block 1310, the process 1300 may include determining, utilizing a trained machine learning model configured to predict distinctiveness of the trademark, a trademark distinctiveness score to associate with the trademark, wherein the trained machine learning model utilizes at least the first data, the second data, the similarity metric, and the context data to predict the trademark distinctiveness score. For example, utilizing some or all of the vector of the mark at issue, the vector of the goods and/or services at issue, the comparison of the mark to the goods and/or services, the context data, the similarity metric with other marks, the analysis of the subset of the marks, etc., a trained machine learning model may be generated and utilized to determine distinctiveness scores. For example, as described in more detail herein, a machine learning model may be trained utilizing a training dataset of some or all of the information described herein. The machine learning model may also be trained based at least in part on outcome data that provides a ground truth for trademark distinctiveness. This ground truth data may include litigation-related data such as data indicating that a reference trademark is associated with a principal register of trademarks or a supplemental register of trademarks, data indicating whether a disclaimer is associated with the reference trademark, data indicating whether an affidavit of incontestability is associated with the reference trademark, and/or data indicating whether an affidavit of continuous use for a predetermined time is associated with the reference trademark. The training data may also include data indicating distinctiveness findings associated with litigation of a reference trademark, data indicating findings of famousness associated with the litigation, and/or data indicating outcomes of cancellation proceedings associated with the reference trademark. A trained machine learning model may be generated and may utilize some or all of the data described herein to generate a trademark distinctiveness score for a given trademark. This distinctiveness score may be utilized for one or more purposes, including for litigation purposes, for brand selection purposes, for brand valuation purposes, for loan acquisition.

Additionally, or alternatively, the process 1300 may include generating a machine learning model configured to predict trademark distinctiveness. The process 1300 may also include generating a training dataset including at least: first reference vector representations of reference trademarks; second reference vector representations of reference goods or services associated with the reference trademarks; reference similarity metrics indicating similarity between individual ones of the first reference vector representations; and third data indicating known distinctiveness outcomes associated with the reference trademarks. The process 1300 may also include training the machine learning model utilizing the training dataset such that the trained machine learning model is generated.

Additionally, or alternatively, the process 1300 may include receiving third data indicating that another trademark has been included in a dataset from which the first data was received. The process 1300 may also include determining to retrain the trained machine learning model based at least in part on the third data. The process 1300 may also include retraining the trained machine learning model utilizing at least the third data.

Additionally, or alternatively, the process 1300 may include generating an aggregated vector representation of the first vector representations, the aggregated vector representation indicating a centroid of the first vector representations. In these examples, determining the similarity metric may be based at least in part on the first vector representation and the aggregated vector representation.

Additionally, or alternatively, the process 1300 may include determining the subset of trademarks to be analyzed, the subset of trademarks determined based at least in part on second vector representations of the goods or services of trademarks having at least a threshold similarity to the second vector representation.

Additionally, or alternatively, the process 1300 may include training the machine learning model based at least in part on at least one of: third data indicating that a reference trademark is associated with a principal register of trademarks or a supplemental register of trademarks; fourth data indicating whether a disclaimer is associated with the reference trademark; fifth data indicating whether an affidavit of incontestability is associated with the reference trademark; or sixth data indicating whether an affidavit of continuous use for a predetermined time is associated with the reference trademark.

Additionally, or alternatively, the process 1300 may include training the machine learning model based at least in part on at least one of: third data indicating distinctiveness findings associated with litigation of a reference trademark; fourth data indicating findings of famousness associated with the litigation; or fifth data indicating outcomes of cancellation proceedings associated with the reference trademark.

Additionally, or alternatively, the process 1300 may include determining a second subset of trademarks, the second subset of trademarks associated with goods or services having a similarity to the second vector representation that does not satisfy the first threshold similarity but that does satisfy a second threshold similarity. The process 1300 may also include weighting the first subset of trademarks more than the second subset of trademarks.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
   receiving first data representing a trademark associated with at least one of a good or service;
   receiving second data representing a description of the at least one of the good or the service;
   querying a set of databases to determine a first language associated with the trademark, individual ones of the set of databases including words in a given language;
   determining that the description of the at least one of the good or the service is in a second language that differs from the first language;
   translating the trademark from the first language to the second language;
   generating, based at least in part on a translated version of the trademark to the second language, third data including a first vector representation of the first data;
   generating fourth data including a second vector representation of the second data;

generating, via a machine learning model trained on feedback and based at least in part on the third data and the fourth data, fifth data indicating a distance between the first vector representation and the second vector representation in a vector space and quantifying a degree of distinctiveness of the trademark in association with the at least one of the good or the service; and sending, via a network protocol over a network to a user device, a command configured to cause an application on the user device to enable and to display, without user input, a recommendation to change the description of the at least one of the good or the service based on the distance satisfying a threshold distance indicating that the trademark is similar to the description of the at least one of the good or the service.

2. The method of claim 1, further comprising:

determining context data associated with the trademark, wherein the context data includes at least one of a first indication that the trademark is associated with a first declaration that the trademark has been in use continuously for at least a first period of time, a second indication that the trademark is associated with a second declaration that an owner of a registration for the trademark has claimed incontestable rights in the trademark, or a third indication that a disclaimer has been associated with the trademark; and weighting the fifth data based at least in part on the context data.

3. The method of claim 1, further comprising:

generating, utilizing text data representing a text portion of the trademark, metadata indicating syllables of the text portion of the trademark;

determining that the syllables of the text portion correspond to a word in a reference database of words; and wherein generating the third data including the first vector representation is based at least in part on the syllables corresponding to the word.

4. The method of claim 1, further comprising:

generating, utilizing text data representing a text portion of the trademark, metadata indicating syllables of the text portion of the trademark;

determining that the syllables of the text portion do not correspond to a word in a reference database of other trademarks; and wherein the fifth data is based at least in part on the syllables of the text portion not corresponding to the word.

5. The method of claim 1, further comprising:

generating a machine learning model configured to determine a correlation between trademarks and related descriptions of goods and services;

generating a training dataset based at least in part on feedback data associated with prior correlations between the trademarks and the related descriptions of goods and services;

training the machine learning model utilizing the training dataset such that a trained machine learning model is generated; and wherein generating the fifth data is performing utilizing the trained machine learning model.

6. The method of claim 1, further comprising:

determining that the distance satisfies a threshold distance indicating that the trademark is similar to the description of the at least one of the good or the service; and generating, based at least in part on the distance satisfying the threshold distance, a recommendation to change the description of the at least one of the good or the service, the recommendation including an alternative description of the at least one of the good or the service, the alternative description associated with a third vector representation having a greater distance from the first vector representation than the distance.

7. The method of claim 1, further comprising:

determining, from text data associated with a text portion of the trademark, that the text portion corresponds to an acronym listed in a database of acronyms;

determining, utilizing the database, a phrase that corresponds to the acronym; and wherein generating the third data including the first vector representation is based at least in part on the phrase that corresponds to the acronym.

8. The method of claim 5, wherein training the machine learning model comprises identifying a new feature that the trained machine learning model will utilize when determining the correlation between the trademarks and the related descriptions of goods and services, the new feature being unutilized by the machine learning model prior to training the machine learning model.

9. The method of claim 5, wherein training the machine learning model comprises applying a first weighting to a feature that the trained machine learning model will utilize when determining the correlation between the trademarks and the related description of goods and services, the first weighting differing from a second weighting of the feature utilized by the machine learning model prior to training the machine learning model.

10. A system, comprising:

one or more processors; and non-transitory computer-readable media storing instructions that, when executed by the one or more processors, cause the one or more processors to perform operations comprising:

receiving first data representing a trademark associated with at least one of a good or service;

receiving second data representing a description of the at least one of the good or the service;

determining that the description of the at least one of the good or the service is in a first language that differs from a second language that the trademark is in;

translating the trademark from the second language to the first language; generating, based at least in part on a translated version of the trademark to the first language, third data including a first vector representation of the first data;

generating fourth data including a second vector representation of the second data;

generating, via a machine learning model trained on feedback and based at least in part on the third data and the fourth data, a value indicating a distance between the first vector representation and the second vector representation in a vector space and quantifying a degree of distinctiveness of the trademark in association with the at least one of the good or the service; and sending, via a network protocol over a network to a user device, a command configured to cause an application on the user device to enable and to display, without user input, a recommendation to change the description of the at least one of the good or the service based on the value indicating the distance between the first vector representation and the second vector representation in the vector space and quantifying the degree of distinctiveness of the trademark in association with the at least one of the good or the service.

11. The system of claim 10, the operations further comprising:
- determining context data associated with the trademark, wherein the context data includes an indication that a disclaimer has been associated with the trademark; and
- weighting the value based at least in part on the context data.

12. The system of claim 10, the operations further comprising:
- generating metadata indicating syllables of a text portion of the trademark;
- determining that the syllables of the text portion correspond to a word in a reference database of words; and
- wherein generating the third data including the first vector representation is based at least in part on the syllables corresponding to the word.

13. The system of claim 10, the operations further comprising:
- generating metadata indicating syllables of a text portion of the trademark;
- determining that the syllables of the text portion do not correspond to from a word in a reference database of other trademarks; and
- wherein the value is based at least in part on the syllables of the text portion not corresponding to the word.

14. The system of claim 10, the operations further comprising:
- generating a machine learning model configured to determine a correlation between trademarks and related descriptions of goods and services;
- generating a training dataset based at least in part on prior feedback data associated with prior correlations between the trademarks and the related descriptions of goods and services;
- training the machine learning model utilizing the training dataset such that a trained machine learning model is generated; and
- wherein generating the value is performing utilizing the trained machine learning model.

15. The system of claim 10, the operations further comprising:
- determining that a text portion of the trademark corresponds to an acronym listed in a database of acronyms;
- determining, utilizing the database, a phrase that corresponds to the acronym; and
- wherein generating the third data including the first vector representation is based at least in part on the phrase that corresponds to the acronym.

16. The system of claim 14, wherein training the machine learning model comprises identifying a new feature that the trained machine learning model will utilize when determining the correlation between the trademarks and the related descriptions of goods and services, the new feature being unutilized by the machine learning model prior to training the machine learning model.

17. The system of claim 14, wherein training the machine learning model comprises applying a first weighting to a feature that the trained machine learning model will utilize when determining the correlation between the trademarks and the related description of goods and services, the first weighting differing from a second weighting of the feature utilized by the machine learning model prior to training the machine learning model.

* * * * *